United States Patent
Sundaram et al.

(10) Patent No.: US 11,943,193 B2
(45) Date of Patent: Mar. 26, 2024

(54) MISDIRECTED EMAIL DATA LOSS PREVENTION

(71) Applicant: Proofpoint, Inc., Sunnyvale, CA (US)

(72) Inventors: Shalini Kamalapuram Sundaram, Sunnyvale, CA (US); Chris Moores, Owen Sound (CA); Durgaprasad Velagaleti, Sunnyvale, CA (US); Srikanth Konjarla, Sunnyvale, CA (US); Harsh Doshi, Sunnyvale, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 0 days.

(21) Appl. No.: 17/834,902

(22) Filed: Jun. 7, 2022

(65) Prior Publication Data
US 2022/0394008 A1 Dec. 8, 2022

Related U.S. Application Data

(60) Provisional application No. 63/208,481, filed on Jun. 8, 2021.

(51) Int. Cl.
*H04L 51/23* (2022.01)
*G06F 21/60* (2013.01)
(Continued)

(52) U.S. Cl.
CPC ............ *H04L 51/23* (2022.05); *G06F 21/606* (2013.01); *H04L 51/21* (2022.05); *H04L 51/42* (2022.05); *H04L 51/56* (2022.05)

(58) Field of Classification Search
None
See application file for complete search history.

(56) References Cited

U.S. PATENT DOCUMENTS

| | | | | |
|---|---|---|---|---|
| 6,671,718 B1 * | 12/2003 | Meister | ............... | G06Q 10/107 709/201 |
| 7,249,175 B1 * | 7/2007 | Donaldson | ........... | G06Q 10/107 709/225 |

(Continued)

FOREIGN PATENT DOCUMENTS

WO 2022046029 A1 3/2022

OTHER PUBLICATIONS

Andrew Disney :"Social network analysis 101: centrality measures explained", https://cambridge-intelligence.com/keylines-faqs-social-network-analysis. Jan. 2, 2020.

(Continued)

*Primary Examiner* — Backhean Tiv
(74) *Attorney, Agent, or Firm* — Banner & Witcoff, Ltd.

(57) ABSTRACT

Aspects of the disclosure relate to data loss prevention. A computing platform may detect input of a first target recipient domain into a first email message. The computing platform may identify, in real time and prior to sending the first email message, that the first target recipient domain is an unintended recipient domain instead of an intended recipient domain. The computing platform may identify, in real time and prior to sending the first email message, that the first email message violates one or more data loss prevention rules. Based on identifying the violation, the computing platform may send a notification that the first target recipient domain is flagged as an unintended recipient domain and one or more commands directing a user device of the message sender to display the notification.

20 Claims, 18 Drawing Sheets

(51) Int. Cl.
  *H04L 51/21* (2022.01)
  *H04L 51/42* (2022.01)
  *H04L 51/56* (2022.01)

(56) References Cited

U.S. PATENT DOCUMENTS

| | | | | |
|---|---|---|---|---|
| 7,499,976 | B2* | 3/2009 | Cato | H04L 51/212 709/224 |
| 7,970,834 | B2* | 6/2011 | Daniels | H04L 51/234 709/213 |
| 8,185,592 | B2* | 5/2012 | Christensen | H04L 51/212 713/170 |
| 8,250,160 | B2* | 8/2012 | Hirota | G06Q 10/107 709/225 |
| 8,769,022 | B2* | 7/2014 | Tivyan | H04L 51/23 709/202 |
| 8,892,672 | B1* | 11/2014 | Rackliffe | H04L 51/52 709/206 |
| 9,137,048 | B2* | 9/2015 | Tokuda | H04L 51/214 |
| 9,378,487 | B2* | 6/2016 | Meister | G06Q 10/107 |
| 9,406,048 | B2* | 8/2016 | Meister | H04L 51/04 |
| 9,418,238 | B2* | 8/2016 | Ito | H04L 9/0894 |
| 10,614,364 | B2* | 4/2020 | Krumm | G06Q 10/00 |
| 10,862,838 | B1* | 12/2020 | Bodapati | H04M 1/7243 |
| 10,868,787 | B2* | 12/2020 | Bishop | H04L 51/48 |
| 11,088,982 | B1* | 8/2021 | Agarwal | H04L 51/48 |
| 2005/0278430 | A1* | 12/2005 | Cato | H04L 51/212 709/206 |
| 2007/0005702 | A1* | 1/2007 | Tokuda | H04L 51/214 709/206 |
| 2007/0226300 | A1* | 9/2007 | Smith | H04L 51/48 709/206 |
| 2011/0055334 | A1* | 3/2011 | Tivyan | H04L 51/23 709/206 |
| 2012/0011192 | A1* | 1/2012 | Meister | H04L 51/04 709/206 |
| 2012/0180134 | A1* | 7/2012 | Coughtrey | G06F 21/606 726/26 |
| 2013/0060863 | A1* | 3/2013 | D'Eri | H04L 51/212 709/206 |
| 2013/0110955 | A1 | 5/2013 | Brady et al. | |
| 2014/0007182 | A1* | 1/2014 | Qureshi | G06F 21/6218 726/1 |
| 2015/0312197 | A1* | 10/2015 | Dong | G06F 3/0481 715/752 |
| 2016/0308814 | A1* | 10/2016 | Meister | H04L 51/23 |
| 2017/0076217 | A1* | 3/2017 | Krumm | G06N 20/00 |
| 2017/0351855 | A1* | 12/2017 | Allen | G06F 21/604 |
| 2018/0131805 | A1* | 5/2018 | Byrne | H04M 1/72436 |
| 2019/0281004 | A1* | 9/2019 | White | G06Q 10/107 |
| 2019/0364001 | A1 | 11/2019 | Dotan-Cohen et al. | |
| 2020/0053035 | A1 | 2/2020 | Mukherjee et al. | |
| 2020/0059447 | A1* | 2/2020 | Bahar | G06F 40/20 |
| 2020/0137110 | A1* | 4/2020 | Tyler | H04L 63/1483 |
| 2020/0151620 | A1* | 5/2020 | Chao | G06N 3/084 |
| 2021/0126944 | A1* | 4/2021 | Lesperance | H04L 63/1433 |
| 2021/0286633 | A1 | 9/2021 | Bar-on et al. | |
| 2022/0239633 | A1* | 7/2022 | Dupont | H04L 63/0236 |
| 2022/0394007 | A1* | 12/2022 | Sundaram | H04L 51/21 |
| 2022/0394008 | A1* | 12/2022 | Sundaram | H04L 51/23 |

OTHER PUBLICATIONS

T.H. Haveliwala: "Topic-Sensitive Page Rank": A Context-Sensitive Ranking Algorithm for Web Search https://www.cs.bham.ac.uk/~pxt/IDA/topic_pagerank.pdf IEEE Transactions on Knowledge and Data Engineering, vol. 15, No. 4, Jul./Aug. 2003.

Farshad Rabib:"University of Tennessee, Knoxville TRACE: Tennessee Resear ennessee Research and Cr ch and Creative Exchange. Supplier Ranking System and Its Effect on the Reliability of the Supply Chain" Dec. 2020 https://citeseerx.ist.psu.edu/viewdoc/download.

Daniel Fogaras et al.: "Towards Scaling Fully Personalized Page Rank: Algorithms, Lower Bounds, and Experiments" Internet Mathematics vol. 2 No.3 333-358, https://projecteuclid.org/journals/internet-mathematics/volume-2/issue-3/Towards-Scaling-Fully-Personalized-PageRank--Algorithms-Lower-Bounds-and/im/1150474886. 2005.

Bahman Bahmani et al.: "Fast Incremental and Personalized PageRank" http://snap.stanford.edu/class p. 173-184; 2010.

Jianshu Weng et al.: Singapore Management University. Institutional Knowledge at Singapore Management University. Research Collection School of Information Systems. https://ink.library.smu.edu. Feb. 2010.

J Weng et al.: "Singapore Management University" Institutional Knowledge at Singapore Management University, Feb. 2010. https://www.cs.cornell.edu/~bindel/blurbs/edge. Feb. 2010.

Xiaoming Liu et al.: "Co-Authorship Networks in the Digital Library Research Community" Preprint submitted to Elsevier Science. https://arxiv.org , Feb. 1, 2008.

Rada Tarau: TextRank: Bringing Order into Texts Rada Mihalcea and Paul Tarau Department of Computer Science University of North Texas, https://web.eecs.umich.edu/~mihalcea/papers/mihalcea.emnlp04.pdf. 1998.

Gartner, Market Guide for Email Security, Mark Harris, Peter Firstbrook, Ravisha Chugh, Mario de Boer https://wiki.proofpoint.com/wiki/display/SOLENG/Misdirected+Email. Oct. 7, 2021.

Baeza-Yates, R et al.: Jun. 1996 "A faster algorithm for approximate string matching". In Dan Hirchsberg; Gene Myers (eds.). Combinatorial Pattern Matching (CPM'96), LNCS 1075. Irvine, CA. pp. 1-23. CiteSeerX 10.1.1.42.1593. https://en.wikipedia.org/wiki/Approximate_string_matching.

Sergey Brin et al.: "The anatomy of a large-scale hypertextual Web search engine" Computer Networks and ISDN Systems 30 1998 107-117. Published 1998 , by http://www.cse.fau.edu/xqzhu/courses/cap6777/google.search.engine.pdf.

Neo4j Graph Data Science Graph Algorithms Centrality PageRank 2022 https://neo4j.com/docs/graph-data-science/current/algorithms/page-rank/.

Neo4j Graph Data Science Graph Algorithms Centrality. 2022. https://neo4j.com/docs/graph-data-science/current/algorithms/centrality/.

Spark 3.2.1:"GraphX Programming Guide"; Jun. 28, 2016; https://spark.apache.org/docs/latest/graphx-programming-guide.html#pagerank.

Spark 1.6.1 Quick Start "Interactive Analysis with the Spark Shell" https://spark.apache.org/docs/1.6.1/api/java/org/apache/spark/graphx/lib/PageRank.html; 2018.

Briggsby "Personalized Page Rank with Edge Weights" Feb. 23, 2021 by Justin https://www.briggsby.com/personalized-pagerank; Feb. 23, 2021.

Mimecast vs Proofpoint https://hq-stash.corp.proofpoint.com/projects/SOLUENG/repos/mde-email-poc-workspace/browse/mde-engine-service. 2022.

Pranay Chandekar: "Evaluate your Recommendation Engine using NDCG" https://towardsdatascience.com/evaluate-your-recommendation-engine-using-ndcg-759a851452d1; Jan. 13, 2020.

Stephen E. Robertson et al. "Okapi BM25" Apr. 11, 2022; http://en.wikipedia.org/wiki/Okapi_BM25.

Algorithm used by Google Search: http://en.wikipedia.org/wiki/PageRank; Jun. 23, 2022.

Christopher J.C. Burges et al. : "Learning to Rank with Nonsmooth Cost Functions" https://www.microsoft.com/en-us/research/wp-content/uploads/2016/02/lambdarank.pdf; 2022.

Chris Burges et al.: "Learning to Rank using Gradient Descent" https://www.microsoft.com/en-us/research/wp-content/uploads/2005/08/icml_ranking.pdf; 2022.

Ying Ding:"Applying weighted Page Rank to author citation networks" https://arxiv.org/pdf/1102.1760.pdf; 2011.

Lars Backstrom et al. : "Supervised Random Walks: Predicting and Recommending Links in Social Networks" https://cs.stanford.edu/~jure/pubs/linkpred-wsdm11.pdf; Feb. 9, 2011.

B. Gao, T.-Y.Liu, W. Wei, T. Wang, and H. Li. Semi-supervised ranking on very large graphs with rich metadata. In KDD, 2011.

(56) References Cited

OTHER PUBLICATIONS

Pnkaj Gupta et al.: "WTF: The Who to Follow Service at Twitter" http://www.vldb.org/conf/2004/RS15P2.PDF; 2011.
Very Large Data Bases Endowment Inc.; hosted by Bluehost; May 28, 2021; http://www.vldb.org/conf/2004/RS15P2.PDF.
Cite Seer X The College of Information Sciences and Technology; https://;http://citeseerx.ist.psu.edu/index; 2016.
Standford University;https://stanford.edu/~rezab/papers/wtf_overview.pdf Mar. 27, 2019.
Oct. 25, 2023—(US) Office Action—U.S. Appl. No. 17/834,887.

\* cited by examiner

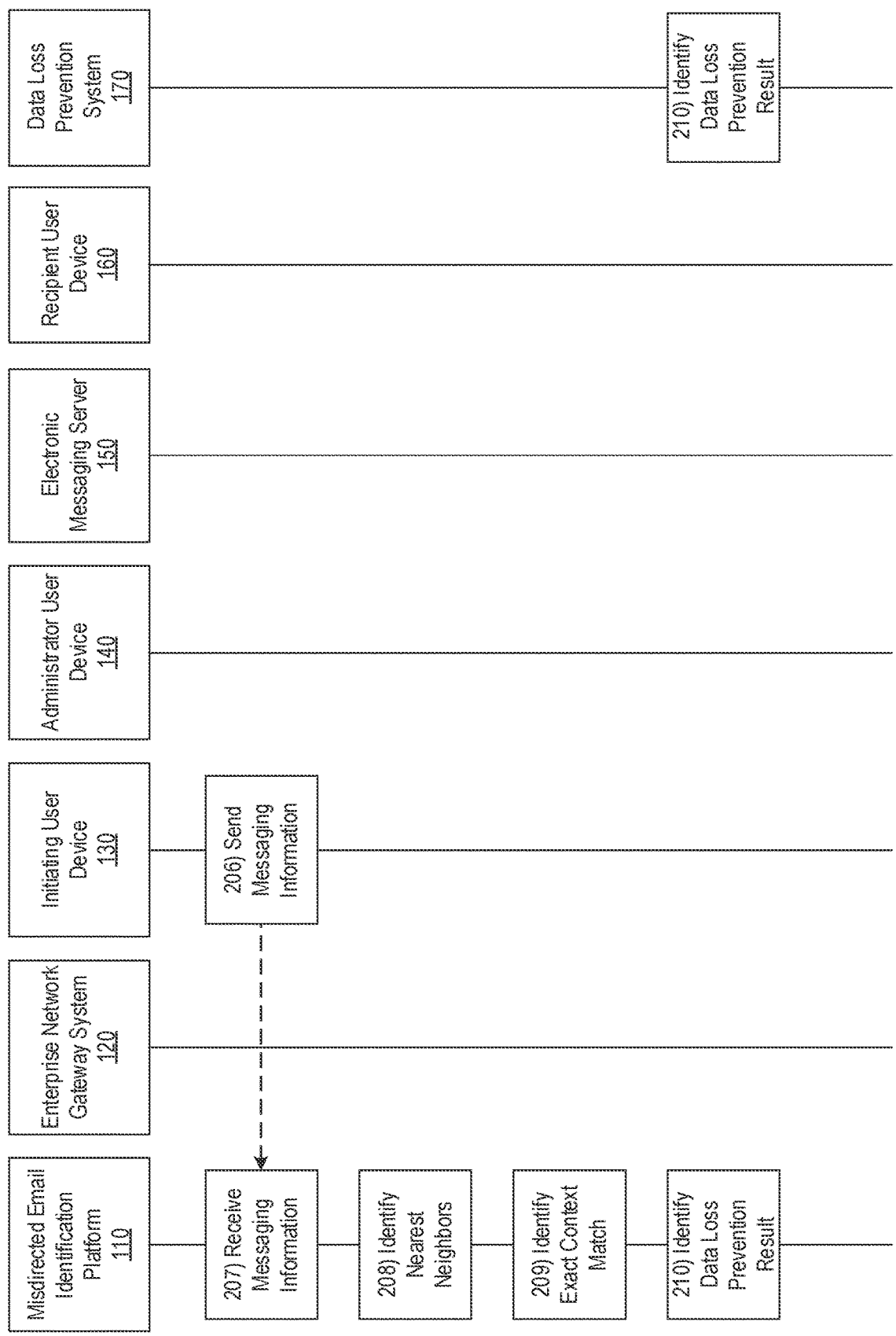

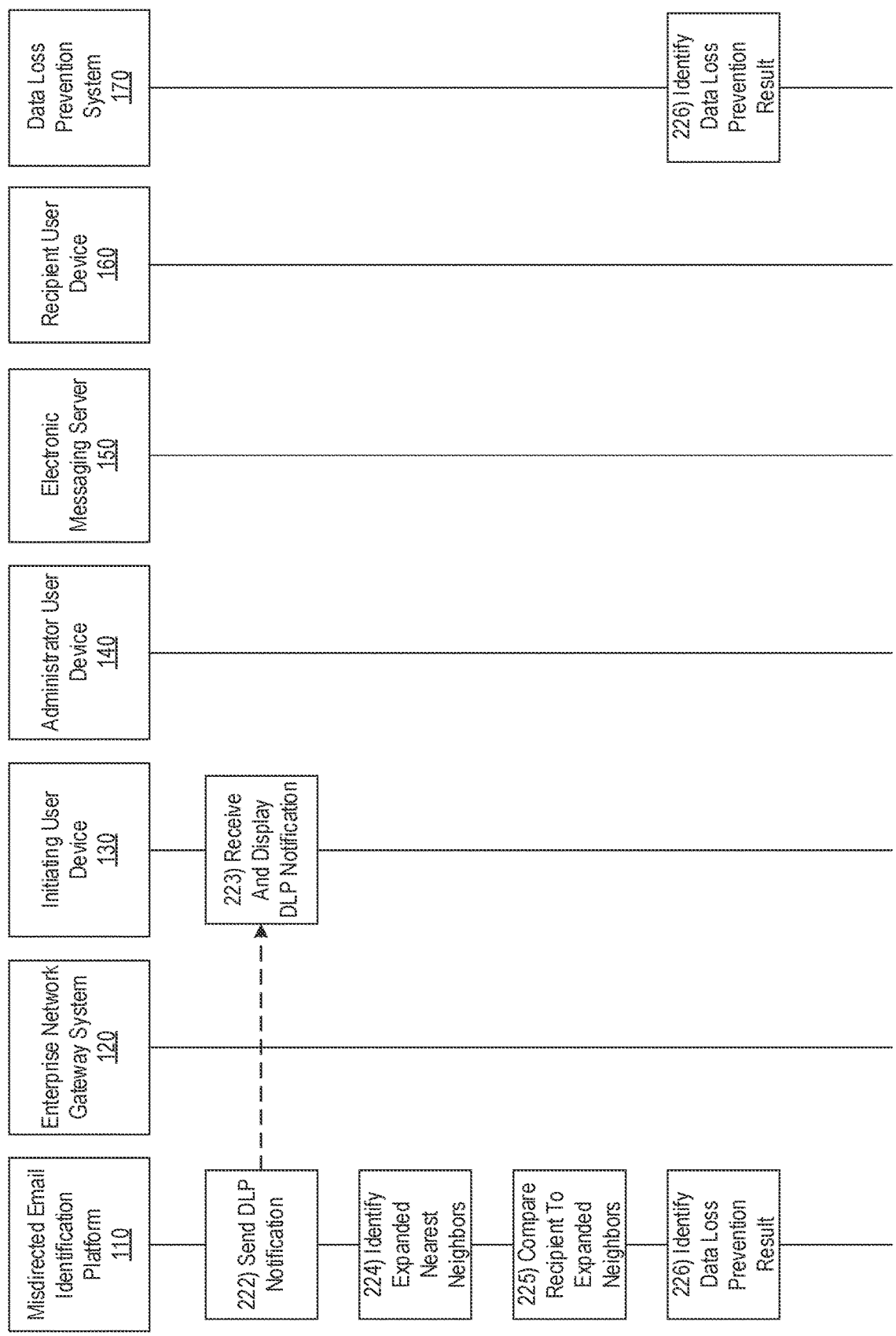

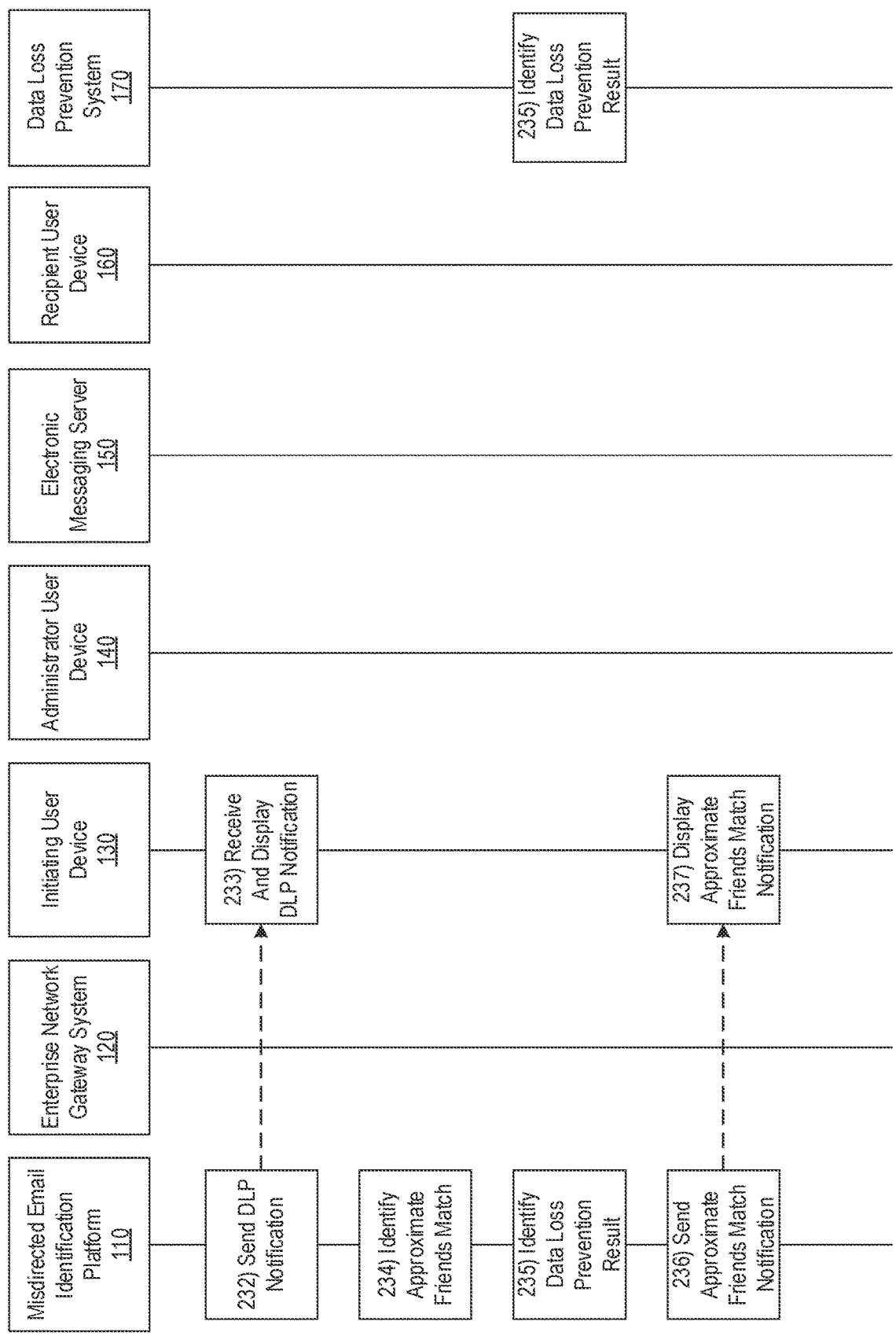

| | Use Case | DLP violation? | MDE Engine Response | End user experience | Admin experience |
|---|---|---|---|---|---|
| 1a | No past history with recipient | No | Alert | NA | Alert |
| 1b | No past history with recipient | Yes | Alert | Alert + Block | Alert |
| 2a | Sender has no past history with recipient, however friends do ** | No | Alert | NA | Alert |
| 2b | Sender has no past history with recipient, however friends do** | Yes | Alert | Alert + Block | Alert |
| 3a | Spelling mistake | No | Alert | NA | Alert |
| 3b | Spelling mistake | Yes | Alert | Alert + Block + Recommend (optional) | Alert |
| 4 | Multiple external domains in 'cc' instead of 'bcc' | NA | Alert | Alert + Block | Alert |
| 5 | "Reply all" instead of reply with multiple external domains (recipients are in 'cc') | NA | Alert | Alert + Block | Alert |
| 6a | Email is sent to wrong person (perfect user id match) | No | Alert | NA | Alert |
| 6b | Email is sent to wrong person (perfect user id match) | Yes | Alert | Alert + Block + Recommend | Alert |
| 7a | Recipient is known to sender, however context is unknown | No | Alert | NA | Alert |
| 7b | Recipient is known to sender, however context is unknown | Yes | Alert | Alert + Block | Alert |

FIG. 9

MISDIRECTED EMAIL DATA LOSS PREVENTION

PRIORITY CLAIM

This application claims the benefit of U.S. Provisional Patent Application 63/208,481, filed Jun. 8, 2021, the disclosure of which is hereby incorporated by reference.

TECHNICAL FIELD

Aspects of the disclosure relate to computer software and hardware for using machine learning to identify misdirected emails. In particular, one or more aspects of the disclosure relate to identifying misdirected emails, and having them modified prior to sending or otherwise blocked to prevent data loss.

BACKGROUND

Increasingly, organizations face various challenges with data loss due to misdirected emails. For example, employees and/or other individuals may accidentally send an email to an unintended recipient (e.g., due to simple negligence, auto-suggestion, small key size, and/or other reasons). In some instances, these misdirected emails may include sensitive data. Such data loss may result in, among other things, financial losses due to fines, loss of brand reputation, loss of productivity, and/or other losses. Attempts to prevent such data loss using efficient and effective automated processes present various technical challenges, particularly when trying to balance prevention of misdirected emails with user experience concerns.

SUMMARY

Aspects of the disclosure provide technical solutions that overcome one or more of the technical problems described above and/or other technical challenges. For instance, one or more aspects of the disclosure relate to data loss prevention.

In accordance with one or more embodiments, a computing platform having at least one processor, a communication interface, and memory may detect input of a first target recipient domain into a first email message. The computing platform may identify, in real time and prior to sending the first email message, that the first target recipient domain is an unintended recipient domain instead of an intended recipient domain. The computing platform may identify, in real time and prior to sending the first email message, that the first email message violates one or more data loss prevention rules. Based on identifying that the first target recipient domain comprises an unintended recipient domain and that the first email message violates the one or more data loss prevention rules, the computing platform may send a notification that the first target recipient domain is flagged as an unintended recipient domain and one or more commands directing a user device of the message sender to display the notification.

In one or more instances, identifying that the first email message violates the one or more data loss prevention rules may include receiving a notification from a data loss prevention system, different than the computing platform, indicating that the first email message violates the one or more data loss prevention rules. In one or more instances, identifying that the first target recipient domain is an unintended recipient domain instead of an intended recipient domain includes receiving a notification from a misdirected email system, different than the computing platform, indicating that the first target recipient domain is an unintended recipient domain.

In one or more examples, identifying that the first target recipient domain is an unintended recipient domain instead of an intended recipient domain may include applying one or more machine learning techniques, by the computing platform, to the first email message. Identifying that the first email message violates the one or more data loss prevention rules may include analyzing, by the computing platform, the first email message based on one or more data loss prevention rules stored at the computing platform.

In one or more instances, the one or more data loss prevention rules may be manually input rules defining message characteristics that, if identified, cause a corresponding email message to be flagged. In one or more instances, the computing platform may detect input of a second target recipient domain into a second email message. The computing platform may identify, in real time and prior to sending the second email message, that the second target recipient domain is an unintended recipient domain instead of an intended recipient domain. The computing platform may identify, in real time and prior to sending the second email message, that the second email message complies with each of the one or more data loss prevention rules. Based on identifying that the second email message complies with each of the one or more data loss prevention rules, the computing platform may route the second email message to the unintended recipient domain.

In one or more examples, identifying that the first target recipient domain is an unintended recipient domain instead of an intended recipient domain may include analyzing, using a user graph and a decision tree model, an identity of the first target recipient domain and a context of the first email message. In one or more examples, analyzing the first email message using the user graph and the decision tree model may include: 1) identifying, using the user graph, a plurality of nearest neighbor recipients for a message sender of the first email message; 2) identifying, using a plurality of machine learning models, a context of the first email message; 3) identifying whether historical messages between the message sender and first target recipient domain include a first level match of the context of the first email message; 4) based on identifying that the historical messages between the message sender and the first target recipient domain include the context of the first email message, identifying whether the first email message violates one or more data loss prevention rules; 5) based on identifying that the historical messages between the message sender and the first target recipient domain do not include the first level match of the context of the first email message: a) identifying whether the first target recipient domain corresponds to a user included in the plurality of nearest neighbor recipients; b) identifying whether the context of the first email message is a second level match with a context of one or more of historical messages between the message sender and the nearest neighbor recipients; c) based on identifying that: the first target recipient domain corresponds to a user included in the plurality of nearest neighbor recipients, and the context of the first email message is a second level match with a context of one or more of historical messages between the message sender and the nearest neighbor recipients, sending a notification to the user device of the message sender indicating that the first email message may be intended for a different recipient and prompting the message sender to send the first email message or modify the first target recipient domain; d) based on identifying that either:

the first target recipient domain does not correspond to a user included in the plurality of nearest neighbor recipients, or the context of the first email message is not a second level match with a context of one or more of historical messages between the message sender and the nearest neighbor recipients: i) identifying, for each nearest neighbor recipient, a corresponding new plurality of nearest neighbor recipients; ii) identifying whether the first target recipient domain is a third level match with a user included in one or more of the new pluralities of nearest neighbor recipients; iii) based on identifying that the first target recipient domain is a third level match with a user included in the one or more of the new pluralities of nearest neighbor recipients, sending a notification to the user device of the message sender indicating that the first email message may be intended for a different recipient and prompting the message sender to send the first email message or modify the first target recipient domain; iv) based on identifying that the first target recipient domain is not a third level match with a user included in the one or more of the new pluralities of nearest neighbor recipients: A) if the context of the first email message was identified as a second level match with a context of the one or more historical messages between the message sender and the nearest neighbor recipients, sending a notification to the user device of the message sender indicating that the first email message may be intended for a different recipient and prompting the message sender to send the first email message or modify the first target recipient domain, which may include a spelling mistake recommendation indicating a difference between the first target recipient domain and one or more recipient domains of the approximate context match; and B) if the context of the first email message was not identified as a second level match with a context of the one or more historical messages between the message sender and the nearest neighbor recipients, sending a notification to the user device of the message sender indicating that the first email message may be intended for a different recipient and prompting the message sender to send the first email message or modify the first target recipient domain.

In one or more instances, the plurality of machine learning models may include: latent Dirichlet allocation (LDA), named entity recognition (NER), text summarization, and/or other techniques. In one or more instances, identifying the context of the first email message may include: 1) identifying, using the LDA, one or more topics in the first email message, 2) identifying, using the NER, one or more named entities in the first email message, and 3) identifying, using the text summarization, a predetermined number of most frequently used keywords in the first email message.

BRIEF DESCRIPTION OF THE DRAWINGS

The present disclosure is illustrated by way of example and not limited in the accompanying figures in which like reference numerals indicate similar elements and in which:

FIGS. 2A-2I depict an illustrative event sequence for preventing data loss due to misdirected emails in in accordance with one or more example embodiments;

FIG. 9 depicts an illustrative table of scenarios for preventing data loss due to misdirected emails in accordance with one or more example embodiments.

DETAILED DESCRIPTION

Figure 1:
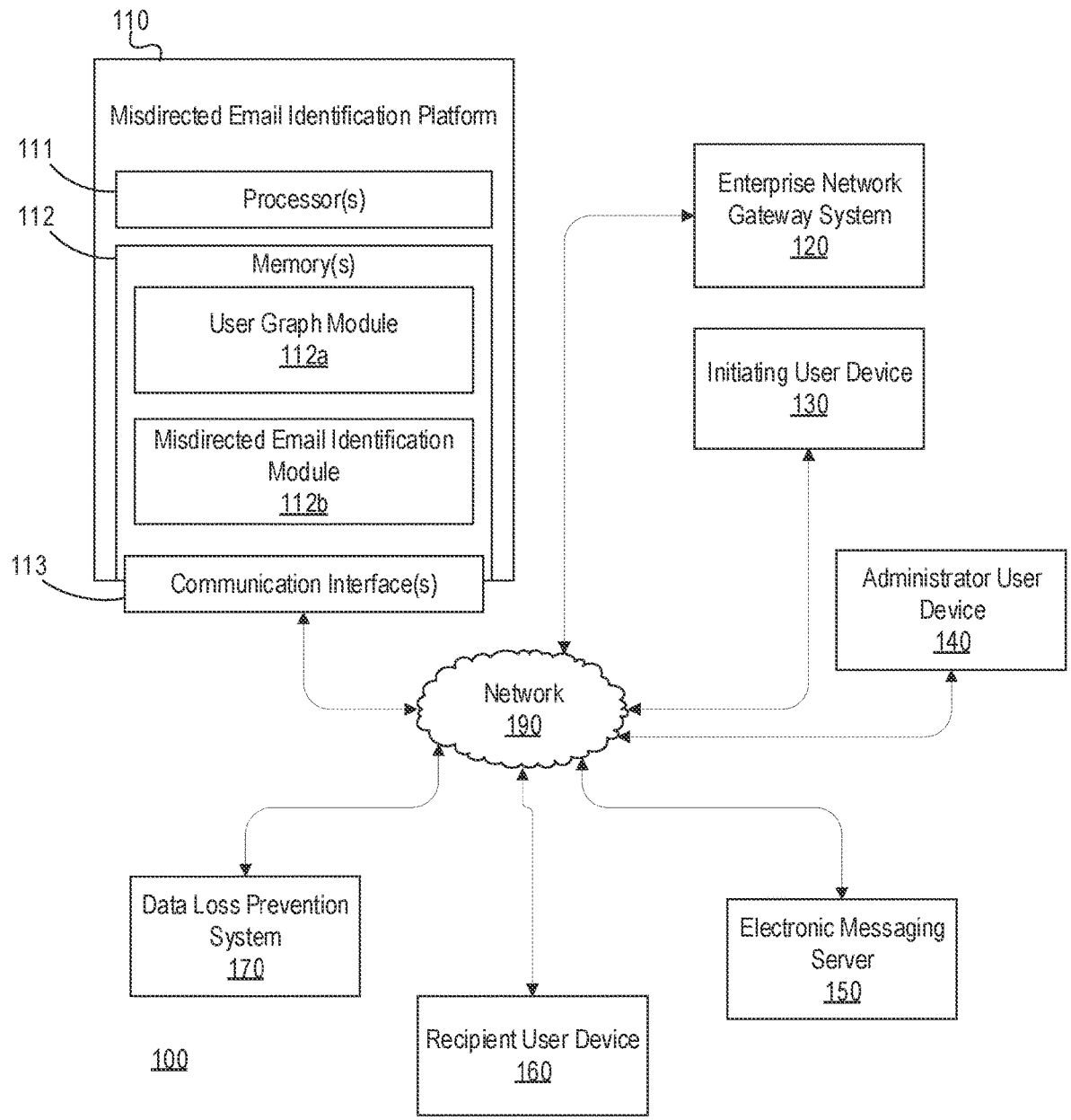
FIG. 1 depicts an illustrative operating environment for preventing data loss due to misdirected emails in in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

As a brief introduction to the concepts described further below, one or more aspects of the disclosure relate to data loss due to misdirected email and prevention thereof. For example, employees and/or other individuals may accidentally send an email to an unintended recipient (e.g., due to simple negligence, auto-suggestion, small key size, and/or other reasons), and in some instances, these emails may include sensitive data. This may result in, among other things, financial loss due to general data protection regulation (GDPR) fines, loss of brand reputation, and/or loss in productivity.

Potential use cases may include: 1) sending a message to an unintended recipient (e.g., wrong domain name, or the like), 2) sending a message to a personal account rather than a business account, 3) adding recipients in the CC line instead of the BCC line (e.g., people listed in the CC field may have their identity exposed to other recipients of the message), 4) replying all instead of replying to a single individual, 5) making spelling mistakes in an email address, and/or other user cases.

Accordingly, the disclosure herein describes integrating a feature into the email gateway that may pull email information and send it to a cloud based system. The system may then identify whether the target recipient is an intended or unintended recipient. Both heuristics and machine learning techniques may be used to make this identification. In some examples, historical data may be analyzed to identify relationships between users, context of communications between users, and the like. In some arrangements, historical email data may be used to train a machine learning model. The analyzed historical data and/or machine learning model may detect potentially misdirected email based on types of data included in the email, whether the email contains sensitive information, email handles of the email recipients, whether a reply or reply-all selection was made, and the like. Subsequently, for each new email, a page ranking may be determined by searching previous communications for similar contexts and performing one or more calculations, e.g., a Levenshtein distance calculation, to identify a potential misdirected email. Querying historical data may include querying specific information in the communications history of a user as well as independent information to determine a potential misdirected email. If an unintended recipient, or potentially unintended recipient, is identified, real time notifications may be provided to indicate potential risk and/or to provide additional security awareness training to the sender. For instance, a notification may be displayed to the user prior to the email being sent, e.g., asking the user to confirm the accuracy of the recipient or whether the recipient was intended prior to sending the email.

FIG. 1 depicts an illustrative operating environment for preventing data loss due to misdirected emails in accordance with one or more example embodiments. Referring to FIG. 1, computing environment 100 may include various computer systems, computing devices, networks, and/or other operating infrastructure. For example, computing environment 100 may include misdirected email identification platform 110, enterprise network gateway system 120, initiating user device 130, administrator user device 140, electronic messaging server 150, recipient user device 160, data loss prevention system 170, and a network 190.

Network 190 may include one or more wired networks and/or one or more wireless networks that interconnect misdirected email identification platform 110, enterprise network gateway system 120, initiating user device 130, administrator user device 140, electronic messaging server 150, recipient user device 160, data loss prevention system 170, and/or other computer systems and/or devices. In addition, each of misdirected email identification platform 110, enterprise network gateway system 120, initiating user device 130, administrator user device 140, electronic messaging server 150, recipient user device 160, and data loss prevention system 170, may be special purpose computing devices configured to perform specific functions, as illustrated in greater detail below, and may include specific computing components such as processors, memories, communication interfaces, and/or the like.

Misdirected email identification platform 110 may include one or more processor(s) 111, one or more memory(s) 112, and one or more communication interface(s) 113. In some instances, misdirected email identification platform 110 may be made up of a plurality of different computing devices, which may be distributed within a single data center or a plurality of different data centers. In these instances, the one or more processor(s) 111, one or more memory(s) 112, and one or more communication interface(s) 113 included in misdirected email identification platform 110 may be part of and/or otherwise associated with the different computing devices that form misdirected email identification platform 110.

In one or more arrangements, processor(s) 111 may control operations of misdirected email identification platform 110. Memory(s) 112 may store instructions that, when executed by processor(s) 111, cause misdirected email identification platform 110 to perform one or more functions, as discussed below. Communication interface(s) 113 may include one or more wired and/or wireless network interfaces, and communication interface(s) 113 may connect misdirected email identification platform 110 to one or more networks (e.g., network 190) and/or enable misdirected email identification platform 110 to exchange information and/or otherwise communicate with one or more devices connected to such networks.

In one or more arrangements, memory(s) 112 may store and/or otherwise provide a plurality of modules (which may, e.g., include instructions that may be executed by processor(s) 111 to cause misdirected email identification platform 110 to perform various functions) and/or databases (which may, e.g., store data used by misdirected email identification platform 110 in performing various functions). For example, memory(s) 112 may store and/or otherwise provide user graph module 112a and misdirected email identification module 112b. In some instances, user graph module 112a may store instructions that cause misdirected email identification platform 110 to identify user connections, which may, e.g., inform misdirected email determinations, and/or execute one or more other functions described herein to prevent data loss. Additionally, misdirected email identification module 112b may store instructions that cause misdirected email identification platform 110 to identify whether an email is misdirected, initiate data loss prevention actions, and/or execute one or more other functions described herein. For example, the misdirected email identification module 112b may be configured to train, host, and/or otherwise refine a machine learning model that may be used to perform these functions.

In some instances, the misdirected email identification platform 110 may host or otherwise support an electronic messaging plugin, which may be used to performed any of the below described features performed by the misdirected email identification platform 110.

Enterprise network gateway system 120 may be or include one or more devices configured to route messages to message recipients (e.g., based on message routing commands received from the misdirected email identification platform 110). In some instances, the enterprise network gateway system 120 may be associated with an enterprise organization of the misdirected email identification platform 110.

Initiating user device 130 may be configured to be used by an individual who may, e.g., be an employee or otherwise associated with an enterprise organization of the misdirected email identification platform 110 and/or enterprise network gateway system 120. For example, the individual may use the initiating user device 130 to compose and/or otherwise send an electronic message. In some instances, the initiating user device 130 may be one of a mobile device, smartphone, tablet, laptop computer, desktop computer, and/or other device configured for electronic messaging. In some instances, initiating user device 130 may be configured to present one or more user interfaces (e.g., which may, e.g., enable the individual to create electronic messages, and/or otherwise provide user input).

Administrator user device 140 may be configured to be used by an individual who may, e.g., be an employee or otherwise associated with an enterprise organization of the misdirected email identification platform 110 and/or enterprise network gateway system 120. For example, the individual may use the administrator user device 140 to define initial data loss prevention rules, policies, and/or other information. In some instances, the administrator user device 140 may be one of a mobile device, smartphone, tablet, laptop computer, desktop computer, and/or other device configured for electronic messaging. In some instances, administrator user device 140 may be configured to present one or more user interfaces (e.g., which may, e.g., enable the individual to define data loss prevention rules, policies, and/or other information). In some instances, the administrator user device 140 may be configured to communicate with the misdirected email identification platform 110 and/or data loss prevention system 170.

Electronic messaging server 150 may be or include one or more devices configured to route messages to message recipients, maintain historical message information, and/or perform other functions. In some instances, the electronic messaging server 150 may be associated with an enterprise organization of the misdirected email identification platform 110.

Recipient user device 160 may be configured to be used by an individual who may, e.g., be an employee or otherwise associated with an enterprise organization affiliated with the misdirected email identification platform 110 and/or enterprise network gateway system 120. For example, the individual may use the recipient user device 160 to receive or otherwise access an electronic message. In some instances, the recipient user device 160 may be one of a mobile device, smartphone, tablet, laptop computer, desktop computer, and/or other device configured for electronic messaging. In some instances, recipient user device 160 may be configured to present one or more user interfaces (e.g., which may, e.g., electronic messaging interfaces and/or other interfaces).

Data loss prevention system 170 may be or include one or more devices configured to store data loss prevention rules configured to identify and/or otherwise prevent data loss. In some instances, data loss prevention system 170 be independent of misdirected email identification platform 110 (e.g., separate products), or included within the misdirected email identification platform 110 (e.g., an integrated product). In some instances, the enterprise network gateway system 120 may be associated with an enterprise organization of the misdirected email identification platform 110. In some instances, the data loss prevention system 170 may host or otherwise support an electronic messaging plugin, which may be used to performed any of the below described features performed by the data loss prevention system 170.

Figure 2A:
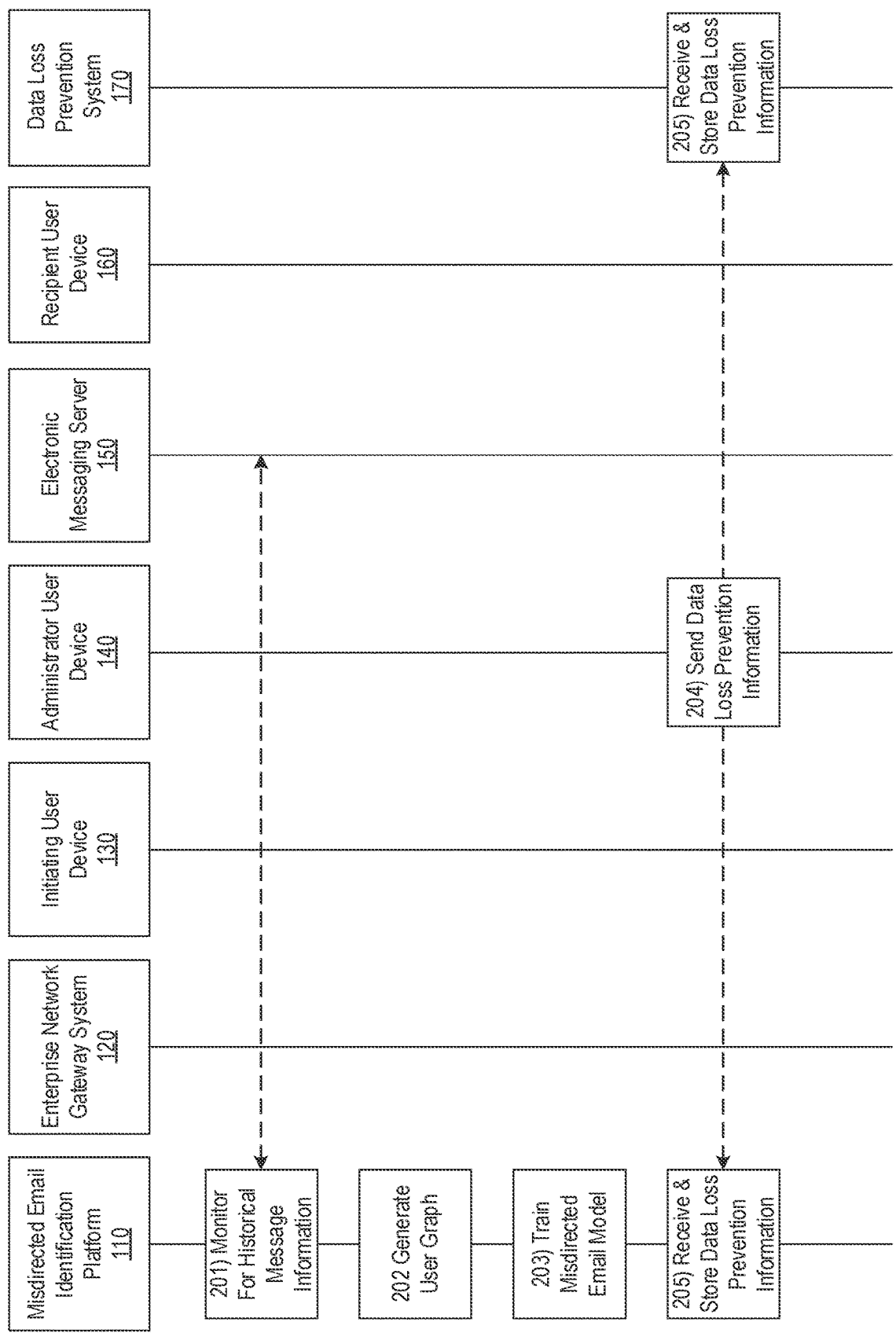

FIGS. 2A-2I depict an illustrative event sequence for preventing data loss due to misdirected emails in accordance with one or more example embodiments. Referring to FIG. 2A, at step 201, the misdirected email identification platform 110 may monitor the electronic messaging server 150 for historical message information. For example, the misdirected email identification platform 110 may monitor the electronic messaging server 150 to detect previously sent messages and their corresponding senders, recipients, content, timestamps, metadata, and/or other message information.

At step 202, the misdirected email identification platform 110 may generate a user graph based on the historical message information. In these instances, the user graph may include nodes for each identified recipient and sender, and may represent various messages as edges between the nodes. For example, if sender #1 sent message #1 to recipient #1, the misdirected email identification platform 110 may represent this message as an edge between the nodes of sender #1 and recipient #1. In some instances, the misdirected email identification platform 110 may also include content, timestamps, metadata, and/or other message information within this relationship (e.g., embedded within or otherwise attached to the relationship). In doing so, the misdirected email identification platform 110 may generate a graph representative of all communications (e.g., as related to an enterprise network or otherwise), storing connections between individuals (including additional layers such as friends of friends, and so on).

In some instances, in generating the user graph, the misdirected email identification platform 110 may generate a multi-modal directed graph, with edges between each node representing emails, instant messaging or other chat messages, meetings initiated by the corresponding user, and/or other messages. In some instances, the misdirected email identification platform may weight each mode of communication. In some instances, the misdirected email identification platform 110 may establish a collaboration trust rank (e.g., a weighted average of an email trust rank, chat trust rank, and/or a meeting trust rank). In these instances, the email, chat, and/or meeting trust ranks may be personalized edge weighted page ranks of emails, chats, and/or meetings respectively (which may be identified, e.g., using machine learning and/or other techniques based on, for example, a number of communications between the corresponding individuals, content of the communications, a number of previously identified misdirected messages, a number of data loss prevention violations, and/or other information). In some instances, the misdirected email identification platform 110 may regularly update the user graph (e.g., as new messaging information is received, at a predetermined time interval, and/or otherwise).

At step 203, the misdirected email identification platform 110 may train a misdirected email model. For example, using the historical message information, the misdirected email identification platform may train a machine learning model to detect potentially misdirected email based on types of data included in the email (e.g., sensitive information, email handles of recipients, whether reply-all selections were made, and/or otherwise).

In some instances, the misdirected email identification platform 110 may train the misdirected email model to calculate a page ranking for each new email. For example, the misdirected email model may be trained to identify similar contexts for a new email based on previous communications and to perform one or more calculations to identify the page ranking (e.g., use a Levenshtein distance to identify a potential typo mismatch, context mismatch, and/or otherwise).

In some instances, in training the misdirected email model, the misdirected email identification platform 110 may use labelled data to train a supervised and/or unsupervised machine learning model (e.g., latent Dirichlet allocation (LDA) model, named entity recognition (NER) model, text summarization model, decision tree, natural language processing model, and/or other model). For example, the misdirected email identification model may train the LDA to identify one or more topics a message. Additionally or alternatively, the misdirected email identification platform 110 may train the NER model to identify one or more named entities (e.g., people, organizations, products, and/or other entities) in a message. Additionally or alternatively, the misdirected email identification platform 110 may train the text summarization model to identify a predetermined number of most frequently used keywords messages). In some instances, the misdirected email identification platform 110 may train different models for different individuals, groups, teams, and/or other subset of individuals.

At step 204, the administrator user device 140 may send data loss prevention information to the misdirected email identification platform 110 and/or a data loss prevention system 170 (which may, e.g., communicate with the misdirected email identification platform 110). For example, the administrator user device 140 may send manually defined heuristics rules, which may be used to identify misdirected emails. For example, the administrator user device 140 may send heuristic rules such as: 1) all other recipients are on a different domain than the target recipient, 2) there are recipients with multiple domains listed on a CC line, 3) comparing the target recipient with an auto-populated list (e.g., populated to include similar addresses with a webmail or company domain), 4) loose data loss prevention (DLP) rules that may be used to warn users, and/or other rules. In some instances, the loose DLP rules may include: 1) emails with pre-configured keywords in a subject line or the content, 2) emails to pre-configured sensitive clients, domains, domain categories, or the like, 3) emails with confidential tags in attachments to external recipients, 4) emails with links to sensitive documents, and/or other rules. In some instances, the misdirected email identification platform 110 may store the heuristics in a data loss prevention model, and input of the messaging information into the data loss prevention model may cause the data loss prevention model to output the data loss prevention result (which may, e.g., indicate whether or not any of the heuristics rules are violated). In some instances, the administrator user device 140 may send different data loss prevention information for different individuals, groups, teams, and/or other subset of individuals. Additionally or alternatively, the data loss prevention information may be sent to the data loss prevention system 170. At step 205, the data loss prevention system 170 and/or misdirected email identification platform 110 may receive and store the data loss prevention information.

Referring to FIG. 2B, at step 206, the initiating user device 130 may send messaging information (e.g., for a first message) to the misdirected email identification platform 110. In some instances, the initiating user device 130 may send the messaging information to the misdirected email identification platform 110 while the first message is being composed and before the first message is sent (e.g., for analysis of the first message in real time). Additionally or alternatively, the initiating user device 130 may send the messaging information to the misdirected email identification platform 110 once a "send" button is selected (e.g., for analysis of the first message once it has been completed). In some instances, in sending the messaging information, the initiating user device 130 may send any information corresponding to the first message (e.g., sender, recipient, content, timestamp, metadata, and/or other information that may be analyzed using the user graph, misdirected email identification model, and/or heuristics as defined above. In some instances, the initiating user device 130 may send the messaging information via a plugin to an electronic mailbox or other messaging service.

At step 207, the misdirected email identification platform 110 may receive the messaging information sent at step 206. In some instances, the misdirected email identification platform 110 may continuously monitor the initiating user device 130 to detect input of a message recipient (e.g., a first target recipient domain) and/or corresponding context information.

At step 208, the misdirected email identification platform 110 may identify, using the messaging information and the user graph, nearest neighbor recipients corresponding to a message sender using initiating user device 130 (e.g., sender of the first message). For example, the misdirected email identification platform 110 may identify, using the user graph, all individuals with whom the message sender has communicated or a subset of individuals with whom the message sender has communicated (e.g., communicated with within a predetermined amount of time of composing the first message, a predetermined number of individuals with whom the message sender has communicated the most, and/or otherwise). In some instances, the misdirected email identification platform 110 may identify the nearest neighbors as team members reporting to a common manager, a top x % of users with the highest collaboration trust rank (e.g., a largest quantity of messages between the message sender and corresponding recipient), where the message sender initiated the communication, recent contacts with whom the sending user initiated the communication, and/or other group individuals.

At step 209, the misdirected email identification platform 110 may input the identified nearest neighbor information and the messaging information into the misdirected email identification model to identify whether or not the context of the first message is an exact match with the context of other, previously sent, messages between the message sender and the message recipient. In some instances, this may be referred to as a first level match. In some instances, this may cause the misdirected email model to compare the messaging information to historical messaging information between the message sender and the identified nearest neighbors to identify whether or not the context of the first message matches the context of other, previously sent, messages between the message sender and the message recipient. For example, the misdirected email identification model may identify one or more topics in the first email message using the LDA. Additionally or alternatively, the misdirected email identification model may identify one or more named entities (e.g., people, organizations, products, and/or other entities) in the first email message using the NER. Additionally or alternatively, the misdirected email identification model may identify a predetermined number of most frequently used keywords in the first email message using the text summarization model (which may, e.g., be a TF IDF model, or other text summarization model). In these instances, the misdirected email identification model may identify a context of the first message based on the identified one or more topics, one or more named entities, most frequently used keywords, and/or other messaging information. Once the context of the first message is identified, the misdirected email identification model may identify whether the context matches the context of historical messages between the message sender and the message recipient (and/or nearest neighbors of the message sender). For example, the misdirected email identification model may identify whether a predetermined threshold number of topics, named entities, keywords, and/or other information matches the topics, named entities, keywords, and/or other information of the historical messages. In some instances, the misdirected email identification model may have specific match thresholds for each of the topics, named entities, keywords, and/or other information. In other instances, the thresholds may be general context thresholds, corresponding to a number of matches between any of the categories (e.g., topics, named entities, keywords, and/or other information). In some instances, the misdirected email identification model may identify an exact match if at least one topic, named entity, and keyword are identified in the first message that matches the historical messages. In some instances, the misdirected email identification platform 110 may also analyze the message sender, message recipients, dates, times, subject lines, attachments (e.g., content of the attachment, file name, attachment label, and/or other information), and/or other information of the first message.

In some instances, the misdirected email identification platform 110 may output a page rank indicating a trustworthiness of the message recipient (e.g., the collaboration trust rank). In some instances, the misdirected email identification platform 110 may perform one or more calculations to identify the page ranking (e.g., use a Levenshtein distance to identify a potential typo mismatch, context mismatch, and/or otherwise). In these instances, the output of the misdirected email identification model may be based on the collaboration trust rank, the Levenshtein distance, and/or other information. If the misdirected email identification platform 110 does detect a context match between the message sender and the message recipient (and/or the nearest neighbors), the misdirected email identification platform 110 may proceed to step 210. If the misdirected email identification platform does not detect a match, it may proceed to step 216.

At step 210, the misdirected email identification platform 110 and/or data prevention system 170 may identify a data loss prevention result indicating whether or not the data loss prevention information/criteria (sent at step 204) is satisfied. For example, the misdirected email identification platform 110 may analyze the messaging information using the heuristics described above at step 204, such as 1) are all other recipients are on a different domain than the target recipient, 2) are there are recipients with multiple domains listed on a CC line, 3) comparing the target recipient with an auto-populated list (e.g., populated to include similar addresses with a webmail or company domain), 4) loose DLP rules that may be used to warn users, and/or other rules. In some instances, the loose DLP rules may include: 1) emails with pre-configured keywords in a subject line or the content, 2) emails to pre-configured sensitive clients, domains, domain categories, or the like, 3) emails with confidential tags in attachments to external recipients, 4) emails with links to sensitive documents, and/or other rules. In some instances, the misdirected email identification platform 110 may store the heuristics in a data loss prevention model, and input of the messaging information into the data loss prevention model may cause the data loss prevention model to output the data loss prevention result (which may, e.g., indicate whether or not any of the heuristics rules are violated).

Figure 8:
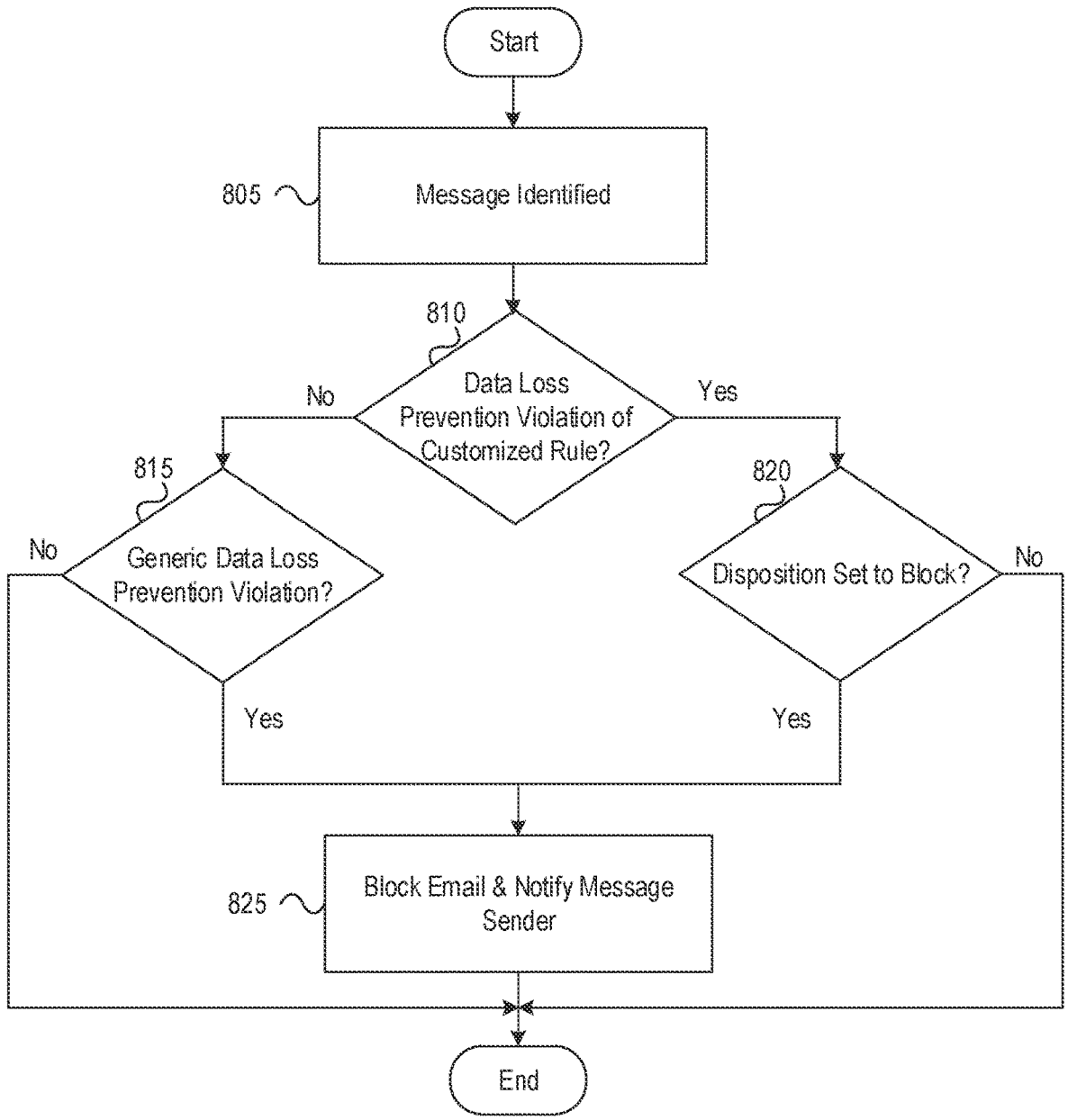

In some instances, the misdirected email identification platform 110 may apply different data loss prevention information for different individuals, groups, teams, and/or other subset of individuals (e.g., in instances where the respective individuals are enrolled in email data loss prevention). In these instances, the misdirected email identification platform 110 and/or data loss prevention system 170 may perform a method similar to the method shown in FIG. 8. For example, referring to FIG. 8, at step 805, the misdirected email identification platform 110 may identify a message. At step 810, once a message is identified, the misdirected email identification platform 110 may identify whether the context of the message violates a user specific data loss prevention rule for the message sender. If so, the misdirected email identification platform 110 may proceed to step 820. Otherwise, the misdirected email identification platform 110 may proceed to step 815.

At step 820, the misdirected email identification platform 110 may identify whether a preconfigured setting indicates that messages flagged as data loss prevention violations should be blocked. If such messages should be blocked, the misdirected email identification platform 110 may block the message and notify the message sender. Otherwise, if such messages should not be blocked, the method may end.

Returning to step 810, if there is no violation of a user specific data loss prevention rule, the misdirected email identification platform 110 may identify whether the message contains confidential or other sensitive content based on a generic data loss prevention scan at step 815. If not, the method may end. Otherwise, the misdirected email identification platform 110 may block the message and notify the message sender as described above with regard to step 825.

Additionally or alternatively, a generic data loss prevention analysis may be performed. In these instances, the misdirected email identification platform 110 and/or data loss prevention system 170 may perform only steps 815 and 825 as described above (e.g., without an analysis based on user specific rules).

With further reference to FIG. 2B, in some instances, the analysis described at step 210 may be performed by the misdirected email identification platform 110 and/or the data loss prevention system 170. In some instances, the data loss prevention system 170 may identify the data loss prevention result, and may send the data loss prevention result (e.g., a success code, violation code, and/or other information) to the misdirected email identification platform 110. Additionally or alternatively, the misdirected email identification platform 110 may send a result of the analysis performed at step 209 to the data loss prevention system 170 (e.g., a success code, violation code, and/or other information), which may then identify the data loss prevention result, and proceed from there. Accordingly, actions described at step 210 may be performed by and/or communicated between misdirected email identification platform 110 and/or data loss prevention system 170 without departing from the scope of the disclosure. If the data loss prevention rules are satisfied, the misdirected email identification platform 110 may proceed to step 211. If the data loss prevention rules are not satisfied, the misdirected email identification platform 110 may proceed to step 214.

Figure 2C:
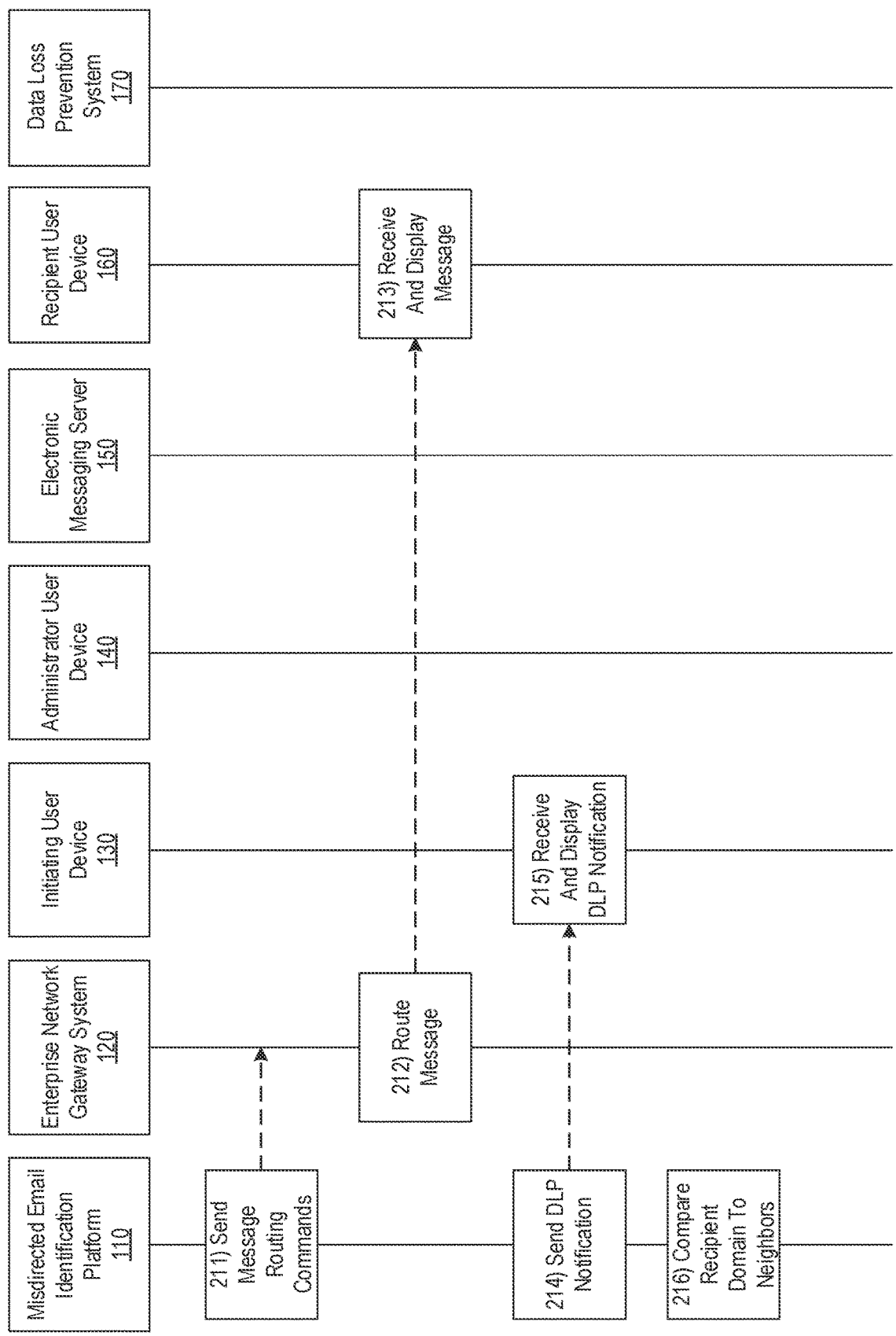

Referring to FIG. 2C, at step 211, based on identifying that the messaging information was a context match for the message sender (based on the knowledge graph and machine learning analysis), as well as satisfied the data loss prevention information/criteria, the misdirected email identification platform 110 may send one or more commands directing the enterprise network gateway system 120 to route the first message to the target recipient (e.g., the recipient user device 160). At step 212, based on or in response to the one or more commands directing the enterprise network gateway system 120 to route the first message to the recipient user device 160, the enterprise network gateway system 120 may route the first message to the recipient user device 160. At step 213, the recipient user device 160 may receive and display the first message routed at step 212.

Returning to step 211, if the misdirected email identification platform 110 determined that the messaging information did not satisfy the data loss prevention information/criteria, the misdirected email identification platform 110 may proceed to step 214. At step 214, the misdirected email identification platform 110 may send a data loss prevention notification, indicating that data loss prevention criteria was not satisfied, to the initiating user device 130. In some instances, the misdirected email identification platform 110 may also send one or more commands directing the initiating user device 130 to display the data loss prevention notification.

Figure 3:
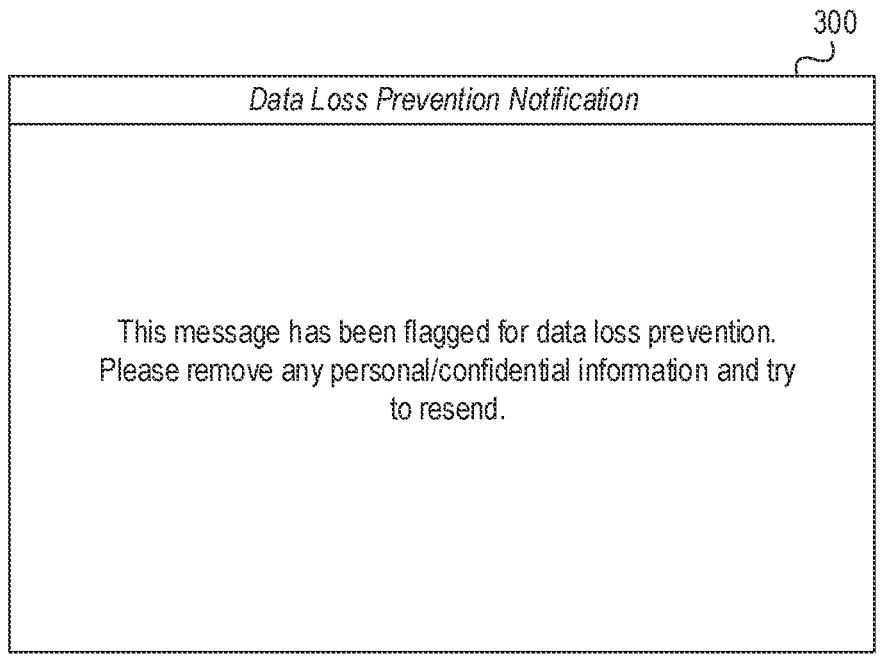
FIGS. 3-6 depict illustrative user interfaces for preventing data loss due to misdirected emails in accordance with one or more example embodiments.

At step 215, the initiating user device 130 may receive the data loss prevention notification sent at step 214. Based on or in response to the one or more commands directing the initiating user device 130 to display the data loss prevention notification, the initiating user device 130 may display the data loss prevention notification. For example, the initiating user device may display a graphical user interface similar to graphical user interface 300, which is shown in FIG. 3, and which indicates that sensitive or otherwise confidential information should be removed from the first message. Once such information has been removed, or an attempt to re-send the first message is otherwise detected, the misdirected email identification platform 110 may return to step 210 to re-assess the first message based on the data loss prevention criteria. In some instances, the data loss prevention notification may also include an option to engage in email security compliance training. In some instances, the notification may include an indication that the target recipient is compromised (e.g., business email compromise notifications, or the like). In some instances, the notification may include options to send the first message to the target recipient anyway or to modify the intended recipient domain. In some instances, the notification may include one or more additional information components or selectable options, such as an indication of a type of data compliance at risk, or an option to select compliance training for reviewing.

Returning to step 209, if the misdirected email identification platform 110 does not identify a nearest neighbors context match, the misdirected email identification platform 110 may proceed to step 216. At step 216, the misdirected email identification platform 110 may identify whether or not the recipient domain is included in the identified nearest neighbor domains (e.g., identified at step 208).

Figure 2D:
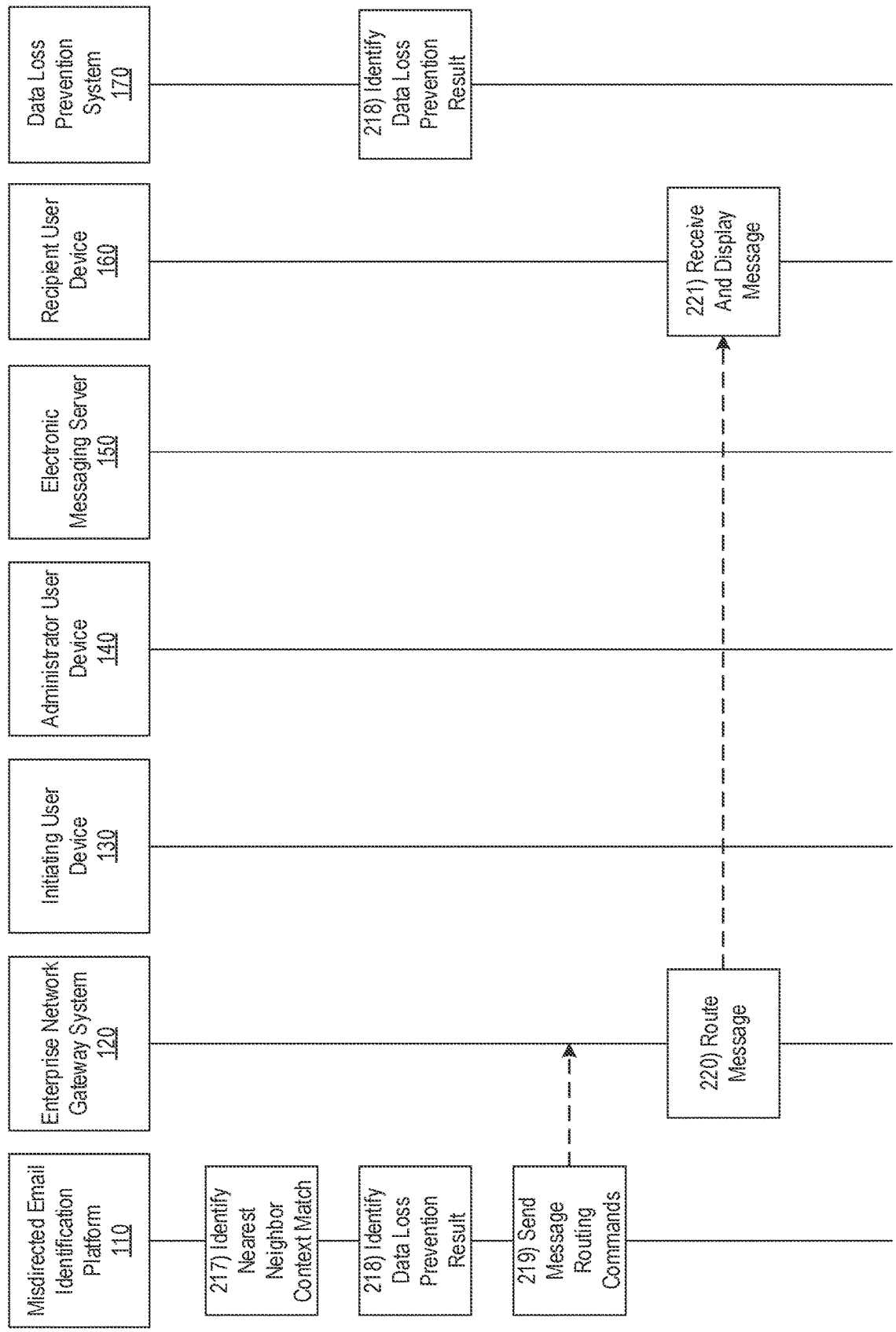

Referring to FIG. 2D, at step 217, the misdirected email identification platform 110 may input the messaging information into the misdirected email identification model and/or revisit the results of the machine learning analysis performed at step 209 to identify whether or not the message information is an approximate context match with historical messages corresponding to the message recipient (e.g., as opposed to an exact match, as the misdirected email identification model attempted to identify at step 209). For example, the misdirected email identification platform 110 may use similar techniques to those described above at step 209 and/or fuzzy matching to identify an approximate match. In some instances, to identify whether there is an approximate match, the misdirected email identification model may compare any identified topics, named entities, keywords, and/or other information to less strict thresholds than those described above with regard to step 209. For example, the misdirected email identification model may, in some instances, have an exact match threshold of 5 (e.g., 5 matching topics, named entities, keywords, and/or other information), whereas the approximate match threshold may be 2. Additionally or alternatively, the misdirected email identification model may identify at least one matching topic, named entity, and keyword to identify an exact match, whereas an approximate match may be identified if at least one matching topic, named entity, or keyword is identified, but not all three. Additionally or alternatively, the misdirected email identification may identify that topics, named entities, and/or keywords identified in the first message do not match the historical messages, but are related to topics, named entities, and/or keywords of the historical messages, and thus may identify an approximate match.

If both the recipient domain is included in the identified nearest neighbor domains and the messaging information indicates an approximate context match (which may, e.g., be referred to as a second level match), the misdirected email identification platform 110 may proceed to step 218. Otherwise, the misdirected email identification platform 110 may proceed to step 224.

At step 218, the misdirected email identification platform 110 may identify a data loss prevention result indicating whether or not the data loss prevention information/criteria (sent at step 204) is satisfied. For example, the misdirected email identification platform 110 may analyze the messaging information using the heuristics described above at step 204, such as 1) are all other recipients are on a different domain than the target recipient, 2) are there are recipients with multiple domains listed on a CC line, 3) comparing the target recipient with an auto-populated list (e.g., populated to include similar addresses with a webmail or company domain), 4) loose DLP rules that may be used to warn users, and/or other rules. In some instances, the loose DLP rules may include: 1) emails with pre-configured keywords in a subject line or the content, 2) emails to pre-configured sensitive clients, domains, domain categories, or the like, 3) emails with confidential tags in attachments to external recipients, 4) emails with links to sensitive documents, and/or other rules. In some instances, the misdirected email identification platform 110 may store the heuristics in a data loss prevention model, and input of the messaging information into the data loss prevention model may cause the data loss prevention model to output the data loss prevention result (which may, e.g., indicate whether or not any of the heuristics rules are violated). In some instances, the misdirected email identification platform 110 may apply different data loss prevention information for different individuals, groups, teams, and/or other subset of individuals (e.g., as described with regard to FIG. 8). Additionally or alternatively, a generic analysis may be performed.

In some instances, the analysis described at step 210 may be performed by the misdirected email identification platform 110 and/or the data loss prevention system 170. In some instances, the data loss prevention system 170 may identify the data loss prevention result, and may send the data loss prevention result to the misdirected email identification platform 110. Additionally or alternatively, the misdirected email identification platform 110 may send a result of the analysis performed at steps 216/217 to the data loss prevention system 170, which may then identify the data loss prevention result, and proceed from there. Accordingly, actions described at step 218 may be performed by and/or communicated between misdirected email identification platform 110 and/or data loss prevention system 170 without departing from the scope of the disclosure. If the data loss prevention rules are satisfied, the misdirected email identification platform 110 may proceed to step 219. If the data loss prevention rules are not satisfied, the misdirected email identification platform 110 may proceed to step 222. In some instances, actions performed at step 218 may be similar to those described above with regard to step 210.

At step 219, based on identifying that the messaging information was an approximate context match for the message sender and that the message recipient was included in the identified nearest neighbors (based on the knowledge graph and machine learning analysis), as well as satisfied the data loss prevention information/criteria, the misdirected email identification platform 110 may send one or more commands directing the enterprise network gateway system 120 to route the first message to the target recipient (e.g., the recipient user device 160).

Figure 4:
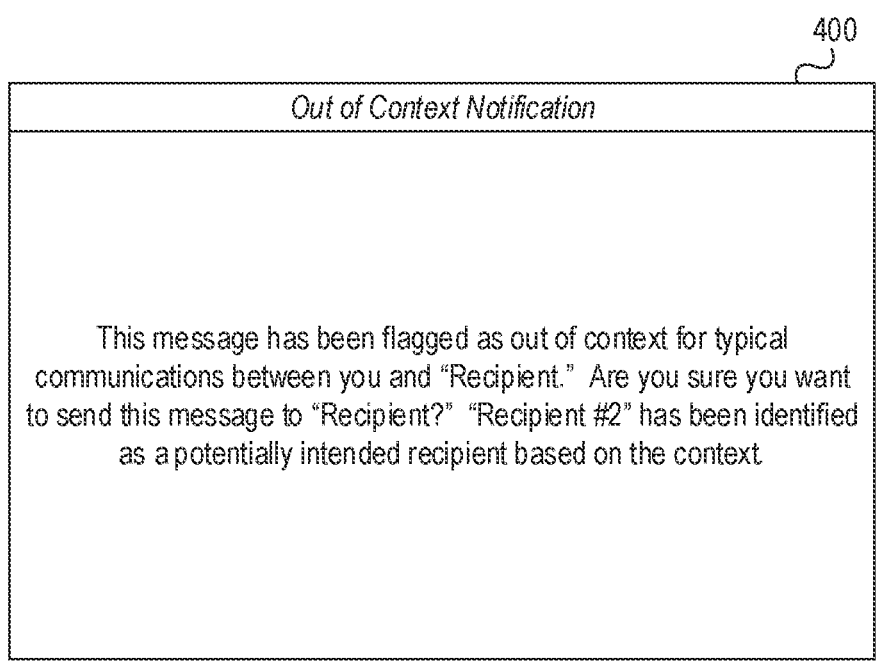

In some instances, prior to sending the one or more commands directing the enterprise network gateway system 120 to route the first message, the misdirected email identification platform 110 may send or otherwise cause display, at the initiating user device 130, of a prompt or other notification indicating that an exact context match was not identified, but that an approximate context match was identified, which may prompt the message sender to confirm that the first message should be sent and/or to correct a potentially unintended recipient. For example, the initiating user device 130 may display a graphical user interface similar to graphical user interface 400, which is shown in FIG. 4. In some instances, the notification may also include an option to engage in email security compliance training. In some instances, the notification may include an indication that the target recipient is compromised (e.g., business email compromise notifications, or the like). In some instances, the notification may include options to send the first message to the target recipient anyway or to modify the intended recipient domain. In some instances, the notification may include one or more additional information components or selectable options, such as an indication of a type of data compliance at risk, or an option to select compliance training for reviewing.

In these instances, if the first message should be sent, the event sequence may proceed to step 220. Otherwise, if the message should not be sent, the event sequence may proceed to step 245. Actions performed at step 219 may be similar to those described above with regard to step 211.

At step 220, based on or in response to the one or more commands directing the enterprise network gateway system 120 to route the first message to the recipient user device 160, the enterprise network gateway system 120 may route the first message to the recipient user device 160. Actions performed at step 220 may be similar to those described above with regard to step 212.

At step 221, the recipient user device 160 may receive and display the first message routed at step 220. Actions performed at step 221 may be similar to those described above with regard to step 213.

Returning to step 218, if the misdirected email identification platform 110 determined that the messaging information did not satisfy the data loss prevention information/criteria, the misdirected email identification platform 110 may proceed to step 222. Referring to FIG. 2E, at step 222, the misdirected email identification platform 110 may send a data loss prevention notification, indicating that data loss prevention criteria was not satisfied, to the initiating user device 130. In some instances, the misdirected email identification platform 110 may also send one or more commands directing the initiating user device 130 to display the data loss prevention notification. In some instances, actions performed at step 222 may be similar to those described above with regard to step 214.

At step 223, the initiating user device 130 may receive the data loss prevention notification sent at step 222. Based on or in response to the one or more commands directing the initiating user device 130 to display the data loss prevention notification, the initiating user device 130 may display the data loss prevention notification. For example, the initiating user device 130 may display a graphical user interface similar to graphical user interface 300, which is shown in FIG. 3, and which indicates that sensitive or otherwise confidential information should be removed from the first message. In some instances, the data loss prevention notification may also include an option to engage in email security compliance training. In some instances, the notification may include an indication that the target recipient is compromised (e.g., business email compromise notifications, or the like). In some instances, the notification may include options to send the first message to the target recipient anyway or to modify the intended recipient domain. In some instances, the notification may include one or more additional information components or selectable options, such as an indication of a type of data compliance at risk, or an option to select compliance training for reviewing.

Once such information has been removed, or an attempt to re-send the first message is otherwise detected, the misdirected email identification platform 110 may return to step 218 to re-assess the first message based on the data loss prevention criteria. In some instances, actions performed at step 223 may be similar to those described above with regard to step 215.

Returning to step 217, if the recipient domain is not included in the identified nearest neighbor domains and/or the messaging information is not an approximate context match with the historical messaging information, the misdirected email identification platform 110 may proceed to step 224. At step 224, the misdirected email identification platform 110 may identify, using the user graph, an additional layer of nearest neighbors (e.g., using a similar technique as described above with regard to the identification of the nearest neighbors at step 208). For example, at step 224, rather than identifying nearest neighbors on the user graph for only the message sender, the misdirected email identification platform 110 may identify nearest neighbor groups for each of the originally identified nearest neighbors (e.g., the nearest neighbor network for each originally identified nearest neighbor, friends of friends, or the like).

At step 225, the misdirected email identification platform 110 may identify whether or not the recipient domain is included in the expanded list of nearest neighbor domains (e.g., identified at step 224). In some instances, this may be referred to as a third level match. For example, actions performed at step 225 may be similar to those performed at step 216, though may be performed with an expanded set of possible recipient domains. If the recipient domain is included in the expanded list of nearest neighbor domains, the misdirected email identification platform 110 may proceed to step 226. Otherwise, if the recipient domain is not included in the expanded list of nearest neighbor domains, the misdirected email identification platform may proceed to step 234.

At step 226, the misdirected email identification platform 110 may identify a data loss prevention result indicating whether or not the data loss prevention information/criteria (sent at step 204) is satisfied. For example, the misdirected email identification platform 110 may analyze the messaging information using the heuristics described above at step 204, such as 1) are all other recipients are on a different domain than the target recipient, 2) are there are recipients with multiple domains listed on a CC line, 3) comparing the target recipient with an auto-populated list (e.g., populated to include similar addresses with a webmail or company domain), 4) loose DLP rules that may be used to warn users, and/or other rules. In some instances, the loose DLP rules may include: 1) emails with pre-configured keywords in a subject line or the content, 2) emails to pre-configured sensitive clients, domains, domain categories, or the like, 3) emails with confidential tags in attachments to external recipients, 4) emails with links to sensitive documents, and/or other rules. In some instances, the misdirected email identification platform 110 may store the heuristics in a data loss prevention model, and input of the messaging information into the data loss prevention model may cause the data loss prevention model to output the data loss prevention result (which may, e.g., indicate whether or not any of the heuristics rules are violated). In some instances, the misdirected email identification platform 110 may apply different data loss prevention information for different individuals, groups, teams, and/or other subset of individuals (e.g., as described with regard to FIG. 8). Additionally or alternatively, a generic analysis may be performed. In some instances, the analysis described at step 226 may be performed by the misdirected email identification platform 110 and/or the data loss prevention system 170. In some instances, the data loss prevention system 170 may identify the data loss prevention result, and may send the data loss prevention result to the misdirected email identification platform 110. Additionally or alternatively, the misdirected email identification platform 110 may send a result of the analysis performed at step 225 to the data loss prevention system 170, which may then identify the data loss prevention result, and proceed from there. Accordingly, actions described at step 226 may be performed by and/or communicated between misdirected email identification platform 110 and/or data loss prevention system 170 without departing from the scope of the disclosure. If the data loss prevention rules are satisfied, the misdirected email identification platform 110 may proceed to step 227. If the data loss prevention rules are not satisfied, the misdirected email identification platform 110 may proceed to step 232. In some instances, actions performed at step 218 may be similar to those described above with regard to step 210.

Figure 2F:
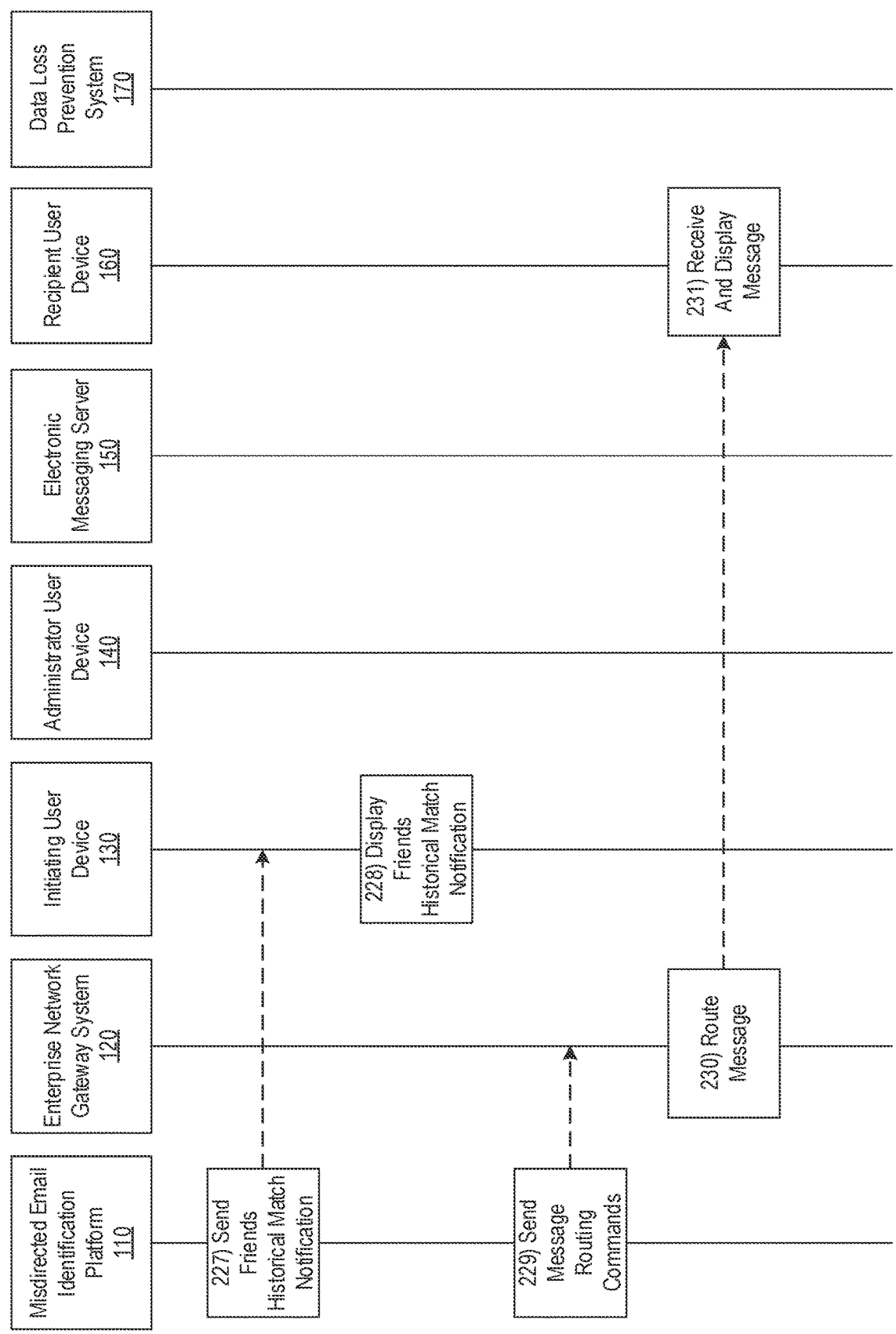

Referring to FIG. 2F, at step 227, the misdirected email identification platform 110 may send a notification to the initiating user device 130 indicating that a friends historical match is identified. For example, the misdirected email identification platform 110 may send a notification indicating that although the content of the first message may be unusual between the message sender and the message recipient, similar content has been exchanged in messages between the identified nearest neighbors and/or nearest neighbors of those identified individuals. In some instances, the notification may prompt the message sender to confirm whether or not the first message should be sent. In some instances, the misdirected email identification platform 110 may also send one or more commands directing the initiating user device 130 to display the friends historical match notification.

Figure 5:
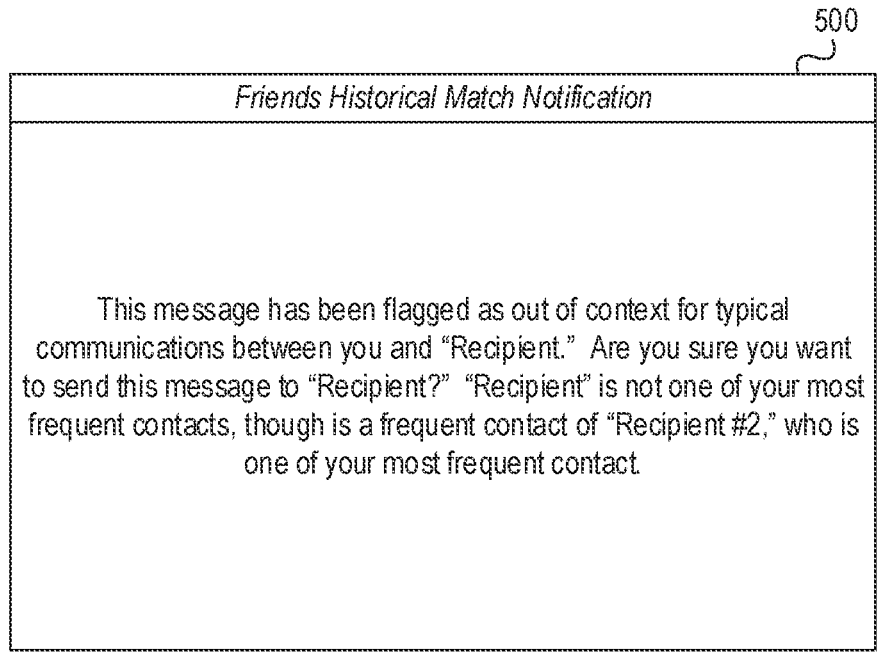
Figure 6:
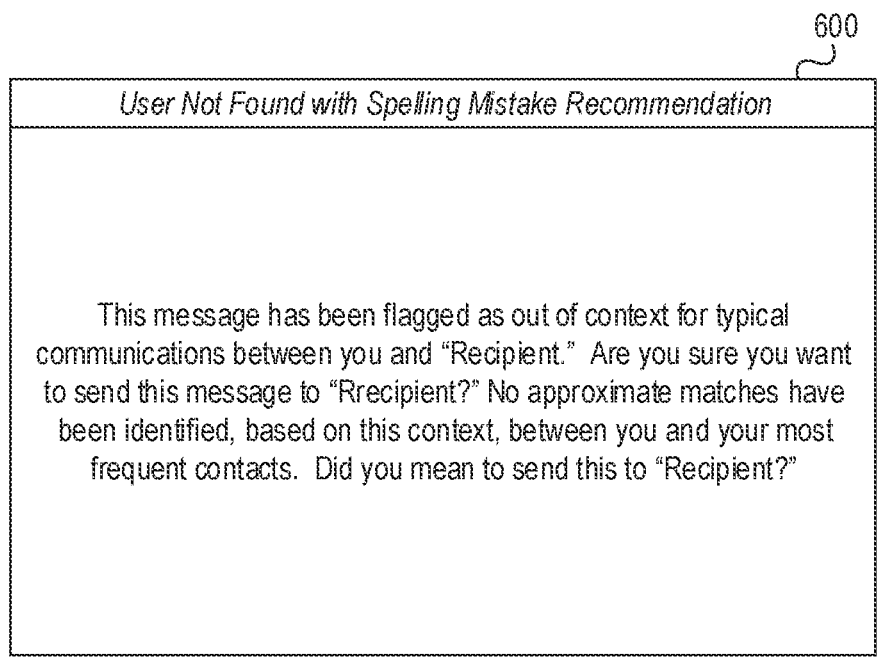

At step 228, the initiating user device 130 may receive the friends historical match notification. In some instances, based on or in response to one or more commands directing the initiating user device 130 to display the friends historical match notification, the initiating user device 130 may display the friends historical match notification (which may, e.g., be similar to graphical user interface 500, which is shown in FIG. 5). In some instances, the friends historical match notification may indicate that although there are no historical messages between the message sender and the message recipient (e.g., the message recipient is not included in the identified nearest neighbors), there are historical messages between the identified nearest neighbors for the message sender and the message recipient (e.g., the message recipient is included in the expanded group of nearest neighbors, corresponding to contacts of the message sender's contact (e.g., friends of friends)). In some instances, the friends historical match notification may also include an option to engage in email security compliance training. In some instances, the notification may include an indication that the target recipient is compromised (e.g., business email compromise notifications, or the like). In some instances, the notification may include options to send the first message to the target recipient anyway or to modify the intended recipient domain. In some instances, the notification may include one or more additional information components or selectable options, such as an indication of a type of data compliance at risk, or an option to select compliance training for reviewing.

If the initiating user device 130 receives input indicating that the first message should be sent, the event sequence may proceed to step 229. Otherwise, if the initiating user device receives input indicating that the first message should not be sent, the event sequence may proceed to step 245.

At step 229, based on identifying that the messaging information was friends historical match for the message sender, as well as satisfied the data loss prevention information/criteria, the misdirected email identification platform 110 may send one or more commands directing the enterprise network gateway system 120 to route the first message to the target recipient (e.g., the recipient user device 160). Actions performed at step 229 may be similar to those described above with regard to step 211.

At step 230, based on or in response to the one or more commands directing the enterprise network gateway system 120 to route the first message to the recipient user device 160, the enterprise network gateway system 120 may route the first message to the recipient user device 160. Actions performed at step 230 may be similar to those described above with regard to step 212.

At step 231, the recipient user device 160 may receive and display the first message routed at step 220. Actions performed at step 231 may be similar to those described above with regard to step 213.

Returning to step 226, if the data loss prevention criteria were not satisfied, the misdirected email identification platform 110 may proceed to step 232. Referring to FIG. 2G, at step 232, the misdirected email identification platform 110 may send a data loss prevention notification, indicating that data loss prevention criteria was not satisfied, to the initiating user device 130. In some instances, the misdirected email identification platform 110 may also send one or more commands directing the initiating user device 130 to display the data loss prevention notification. In some instances, actions performed at step 232 may be similar to those described above with regard to step 214.

At step 233, the initiating user device 130 may receive the data loss prevention notification sent at step 232. Based on or in response to the one or more commands directing the initiating user device 130 to display the data loss prevention notification, the initiating user device 130 may display the data loss prevention notification. For example, the initiating user device may display a graphical user interface similar to graphical user interface 300, which is shown in FIG. 3, and which indicates that sensitive or otherwise confidential information should be removed from the first message. In some instances, the data loss prevention notification may also include an option to engage in email security compliance training. In some instances, the notification may include an indication that the target recipient is compromised (e.g., business email compromise notifications, or the like). In some instances, the notification may include options to send the first message to the target recipient anyway or to modify the intended recipient domain. In some instances, the notification may include one or more additional information components or selectable options, such as an indication of a type of data compliance at risk, or an option to select compliance training for reviewing.

Once such information has been removed, or an attempt to re-send the first message is otherwise detected, the misdirected email identification platform 110 may return to step 26 to re-assess the first message based on the data loss prevention criteria. In some instances, actions performed at step 233 may be similar to those described above with regard to step 215.

Returning to step 225, if the recipient domain is not included in the expanded nearest neighbor domains, the misdirected email identification platform 110 may proceed to step 234.

At step 234, the misdirected email identification platform 110 may input the messaging information and the nearest neighbor information into the misdirected email identification to identify whether or not there is an approximate match between the messaging information and historical message recipient information of messages between the message sender and/or the nearest neighbors (e.g., using similar techniques as described above with regard to the analysis described above at step 217). In some instances, this may be referred to as a fourth level match. For example, the misdirected email identification model may identify a Levenschtein distance between the message recipient address and each of the addresses for the nearest neighbors (e.g., the originally identified nearest neighbors rather than the expanded nearest neighbor group). In these instances, the misdirected email identification model may compare the smallest identified Levenschtein distance to an approximate historical match threshold. If the Levenschtein distance exceeds the approximate historical match threshold, an approximate match might not be determined. If the Levenschtein distance does not exceed the approximate historical match threshold, an approximate match may be determined. If an approximate match is determined, the misdirected email identification platform 110 may proceed to step 235. Otherwise, if no approximate match is determined, the misdirected email identification platform 110 may proceed to step 243.

At step 235, the misdirected email identification platform 110 may identify a data loss prevention result indicating whether or not the data loss prevention information/criteria (sent at step 204) is satisfied. For example, the misdirected email identification platform 110 may analyze the messaging information using the heuristics described above at step 204, such as 1) are all other recipients are on a different domain than the target recipient, 2) are there are recipients with multiple domains listed on a CC line, 3) comparing the target recipient with an auto-populated list (e.g., populated to include similar addresses with a webmail or company domain), 4) loose DLP rules that may be used to warn users, and/or other rules. In some instances, the loose DLP rules may include: 1) emails with pre-configured keywords in a subject line or the content, 2) emails to pre-configured sensitive clients, domains, domain categories, or the like, 3) emails with confidential tags in attachments to external recipients, 4) emails with links to sensitive documents, and/or other rules. In some instances, the misdirected email identification platform 110 may store the heuristics in a data loss prevention model, and input of the messaging information into the data loss prevention model may cause the data loss prevention model to output the data loss prevention result (which may, e.g., indicate whether or not any of the heuristics rules are violated). In some instances, the misdirected email identification platform 110 may apply different data loss prevention information for different individuals, groups, teams, and/or other subset of individuals (e.g., as described with regard to FIG. 8). Additionally or alternatively, a generic analysis may be performed. In some instances, the analysis described at step 235 may be performed by the misdirected email identification platform 110 and/or the data loss prevention system 170. In some instances, the data loss prevention system 170 may identify the data loss prevention result, and may send the data loss prevention result to the misdirected email identification platform 110. Additionally or alternatively, the misdirected email identification platform 110 may send a result of the analysis performed at step 234 to the data loss prevention system 170, which may then identify the data loss prevention result, and proceed from there. Accordingly, actions described at step 234 may be performed by and/or communicated between misdirected email identification platform 110 and/or data loss prevention system 170 without departing from the scope of the disclosure. If the data loss prevention rules are satisfied, the misdirected email identification platform 110 may proceed to step 236. If the data loss prevention rules are not satisfied, the misdirected email identification platform 110 may proceed to step 241. In some instances, actions performed at step 235 may be similar to those described above with regard to step 210.

At step 236, the misdirected email identification platform 110 may send a notification to the initiating user device 130 indicating that an approximate friends historical match is detected. For example, the misdirected email identification platform 110 may send a notification indicating a potential spelling mistake in the recipient address, and, in some instances, a recommended correction. In some instances, the misdirected email identification platform 110 may also send one or more commands directing the initiating user device 130 to display the approximate friends historical match notification.

At step 237, the initiating user device 130 may receive the approximate friends historical match notification. In some instances, the initiating user device 130 may display the approximate friends historical match notification based on or in response to the one or more commands directing the initiating user device 130 to display the approximate friends historical match notification. In some instances, the initiating user device 130 may display a graphical user interface similar to graphical user interface 600, which indicates that although no approximate context matches have been identified in the message senders network, an approximate historical recipient has been identified (which may, e.g., be due to a spelling mistake in the recipient address). In some instances, the initiating user device 130 may display a difference between the recipient address and an alternative, suggested recipient address. In some instances, the approximate friends historical match notification may also include an option to engage in email security compliance training. In some instances, the notification may include an indication that the target recipient is compromised (e.g., business email compromise notifications, or the like). In some instances, the notification may include options to send the first message to the target recipient anyway or to modify the intended recipient domain. In some instances, the notification may include one or more additional information components or selectable options, such as an indication of a type of data compliance at risk, or an option to select compliance training for reviewing.

In some instances, the approximate friends historical match notification may prompt the message sender as to whether or not the first message should still be sent. If the first message should still be sent, the event sequence may proceed to step 238. If the first message should not be sent, the event sequence may proceed to step 245.

Figure 2H:
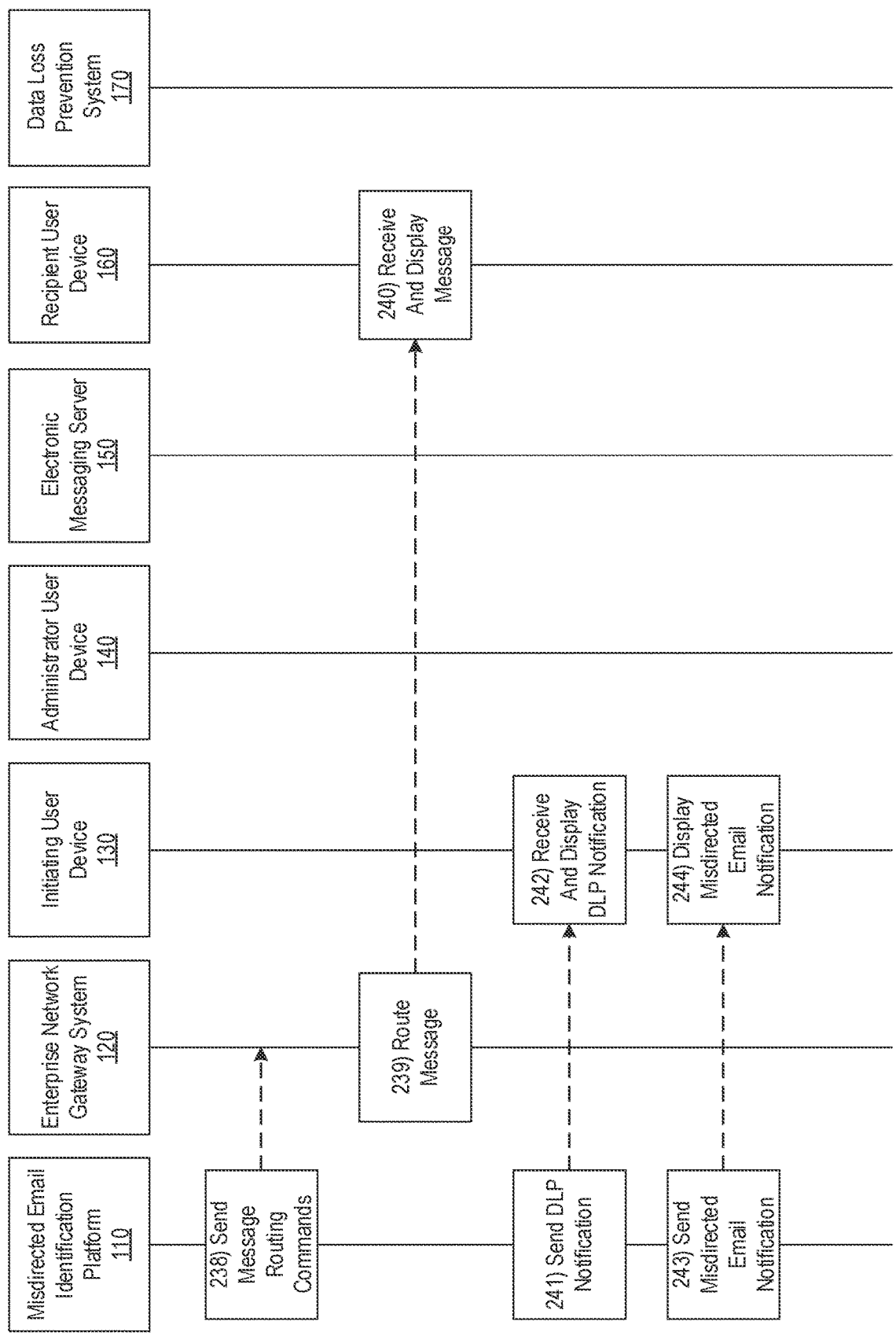

With reference to FIG. 2H, at step 238, based on identifying that the messaging information was friends historical match for the message sender, as well as satisfied the data loss prevention information/criteria, the misdirected email identification platform 110 may send one or more commands directing the enterprise network gateway system 120 to route the first message to the target recipient (e.g., the recipient user device 160). Actions performed at step 238 may be similar to those described above with regard to step 211.

At step 239, based on or in response to the one or more commands directing the enterprise network gateway system 120 to route the first message to the recipient user device 160, the enterprise network gateway system 120 may route the first message to the recipient user device 160. Actions performed at step 239 may be similar to those described above with regard to step 212.

At step 240, the recipient user device 160 may receive and display the first message routed at step 220. Actions performed at step 240 may be similar to those described above with regard to step 213.

Returning to step 235, if the data loss prevention criteria are not satisfied, the misdirected email identification platform 110 may proceed to step 241. At step 241, the misdirected email identification platform 110 may send a data loss prevention notification, indicating that data loss prevention criteria was not satisfied, to the initiating user device 130. In some instances, the misdirected email identification platform 110 may also send one or more commands directing the initiating user device 130 to display the data loss prevention notification. In some instances, actions performed at step 241 may be similar to those described above with regard to step 214.

At step 242, the initiating user device 130 may receive the data loss prevention notification sent at step 241. Based on or in response to the one or more commands directing the initiating user device 130 to display the data loss prevention notification, the initiating user device 130 may display the data loss prevention notification. In some instances, the data loss prevention notification may also include an option to engage in email security compliance training. In some instances, the notification may include an indication that the target recipient is compromised (e.g., business email compromise notifications, or the like). In some instances, the notification may include options to send the first message to the target recipient anyway or to modify the intended recipient domain. In some instances, the notification may include one or more additional information components or selectable options, such as an indication of a type of data compliance at risk, or an option to select compliance training for reviewing.

For example, the initiating user device may display a graphical user interface similar to graphical user interface 300, which is shown in FIG. 3, and which indicates that sensitive or otherwise confidential information should be removed from the first message. Once such information has been removed, or an attempt to re-send the first message is otherwise detected, the misdirected email identification platform 110 may return to step 235 to re-assess the first message based on the data loss prevention criteria. In some instances, actions performed at step 242 may be similar to those described above with regard to step 215.

At step 243, the misdirected email identification platform 110 may send a misdirected email notification to the initiating user device 130. In some instances, the misdirected email identification platform 110 may also send one or more commands directing the initiating user device 130 to display the misdirected email notification. At step 244, the initiating user device 130 may receive the misdirected email notification. In some instances, based on or in response to the one or more commands directing the initiating user device 130 to display the misdirected email notification, the initiating user device 130 may display the misdirected email notification. For example, the initiating user device 130 may display a notification indicating that the first message appears to be misdirected (and no alternative recipient could be identified based on the message senders message history and/or contacts), and will not be sent. In some instances, the misdirected email notification may also include an option to engage in email security compliance training. In some instances, the notification may include an indication that the target recipient is compromised (e.g., business email compromise notifications, or the like). In some instances, the notification may include options to send the first message to the target recipient anyway or to modify the intended recipient domain. In some instances, the notification may include one or more additional information components or selectable options, such as an indication of a type of data compliance at risk, or an option to select compliance training for reviewing.

Figure 2I:
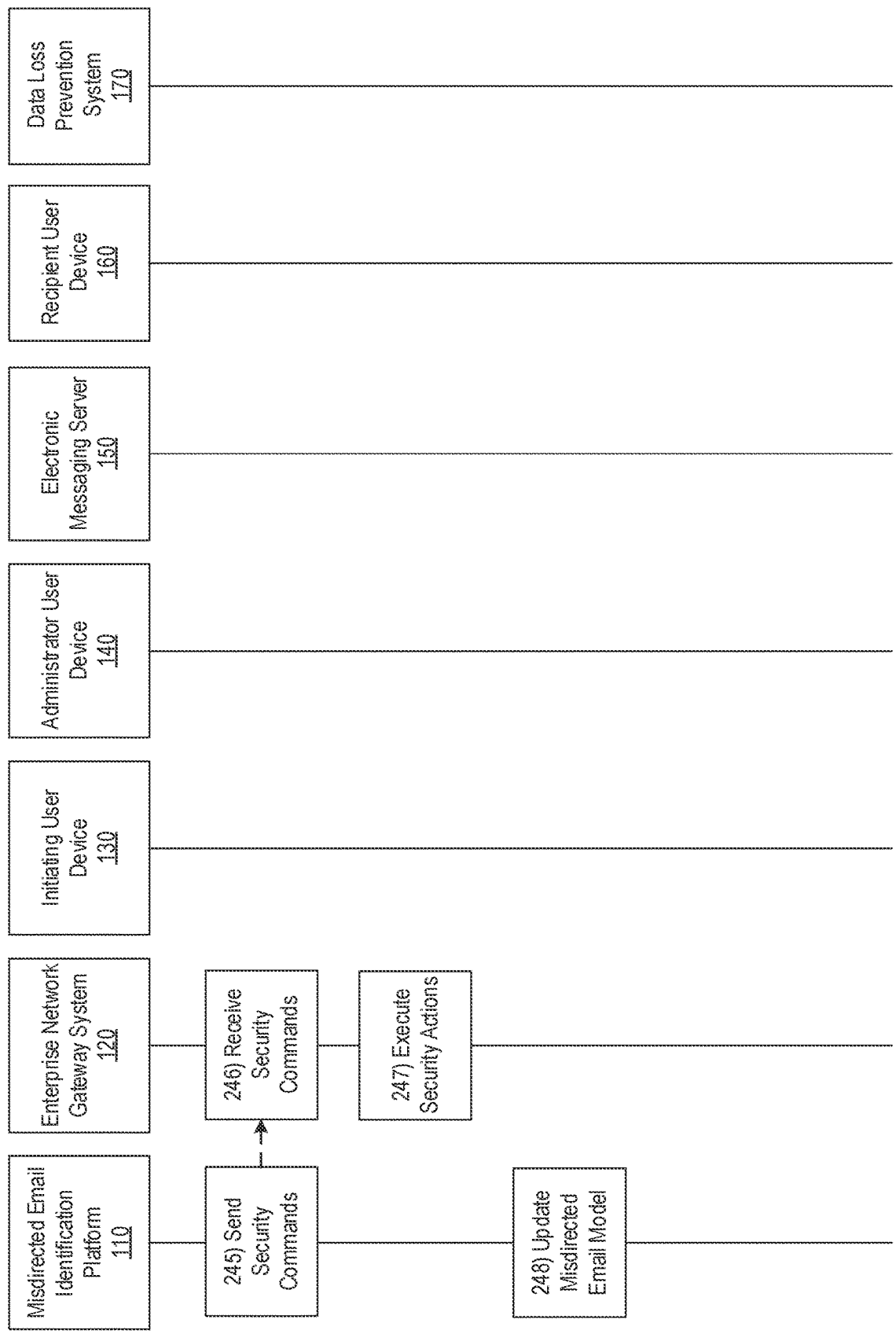

Referring to FIG. 2I, at step 245, the misdirected email identification platform 110 may send one or more security commands directing the enterprise network gateway system 120 to execute one or more security actions in response. For example, the misdirected email identification platform 110 may direct the enterprise network gateway system 120 to block future messages from the message sender, quarantine the message, update one or more network security policies, and/or perform other actions. At step 246, the enterprise network gateway system 120 may receive the one or more security commands sent at step 245.

At step 247, based on or in response to the one or more security commands, the enterprise network gateway system 120 may execute one or more security actions.

At step 248, the misdirected email identification platform 110 may feed the messaging information and any outputs from the misdirected email identification model back into the model. Additionally or alternatively, the misdirected email identification platform 110 may feed any user feedback (e.g., from the message sender) back into the misdirected email identification model. In doing so, the misdirected email identification platform 110 may establish a dynamic feedback loop that may continuously improve accuracy of the misdirected email identification model by updating based on any newly received or otherwise current information and/or model outputs. Additionally or alternatively, the misdirected email identification platform 110 may update the user graph based on the messaging information (e.g., add the message recipient and/or increase a trustworthiness of an existing recipient). In doing so, the misdirected email identification platform 110 may improve data loss prevention techniques performed by the misdirected email identification platform 110 over time.

By implementing the methods described in steps 201-248, both misdirected email identification methods and email data loss prevention methods may be integrated. For example, if an email is identified as misdirected, but does not violate data loss prevention rules, the email may nevertheless be sent (e.g., to minimize notifications to a user). In contrast, if an email is identified as properly directed, but does violate data loss prevention rules, the message may be blocked (e.g., to prevent unauthorized transfer of confidential or other sensitive information). If a message is flagged using both the misdirected email identification and data loss prevention methods, it may similarly be blocked. Although shown as being performed in sequence, this is for illustrative purposes only, and in some instances, the misdirected email identification and data loss prevention methods/techniques may be performed in parallel. Furthermore, in some instances, outputs of each method/technique may be sent to a separate system for a final determination of how to proceed and/or to notify the message sender. In doing so, user experience may be balanced with message security and data loss, so as to prevent the sending of misdirected messages only when necessary. In some instances, the results of these methods for different use cases may be summarized in table 905, which is shown in FIG. 9.

The steps described in the illustrative event sequence herein may be performed in any alternative sequence or order without departing from the scope of the disclosure. Furthermore, the above described systems, event sequence, and methods may be applied in any messaging contexts (e.g., text messages, chat messages, emails, and/or other messages) without departing from the scope of the disclosure. In some instances, an output of the misdirected email identification method may be sent to the data loss prevention system 170 to finalize the analysis (and/or back and forth communication between the two systems may be performed). In some instances, an output may be sent from the data loss prevention system 170 to the misdirected email identification platform 110 to finalize the analysis (and/or back and forth communication between the two systems may be performed). In some instances, the misdirected email identification platform 110 and the data loss prevention system 170 may be separate distinct systems, and in other instances, may be combined into a single system.

Figure 7A:
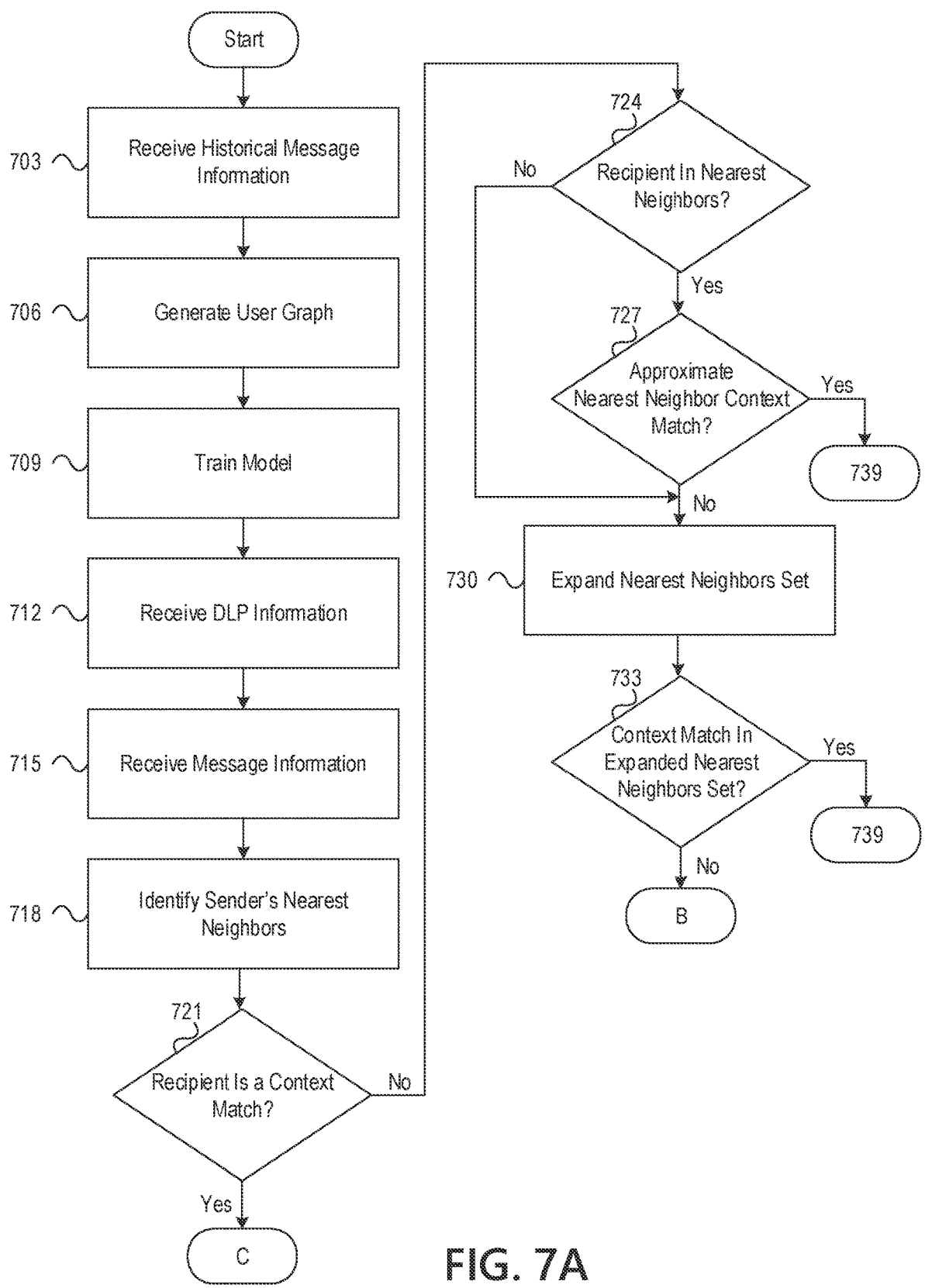
FIGS. 7A-8 depict illustrative methods for preventing data loss due to misdirected emails in accordance with one or more example embodiments.
Figure 7B:
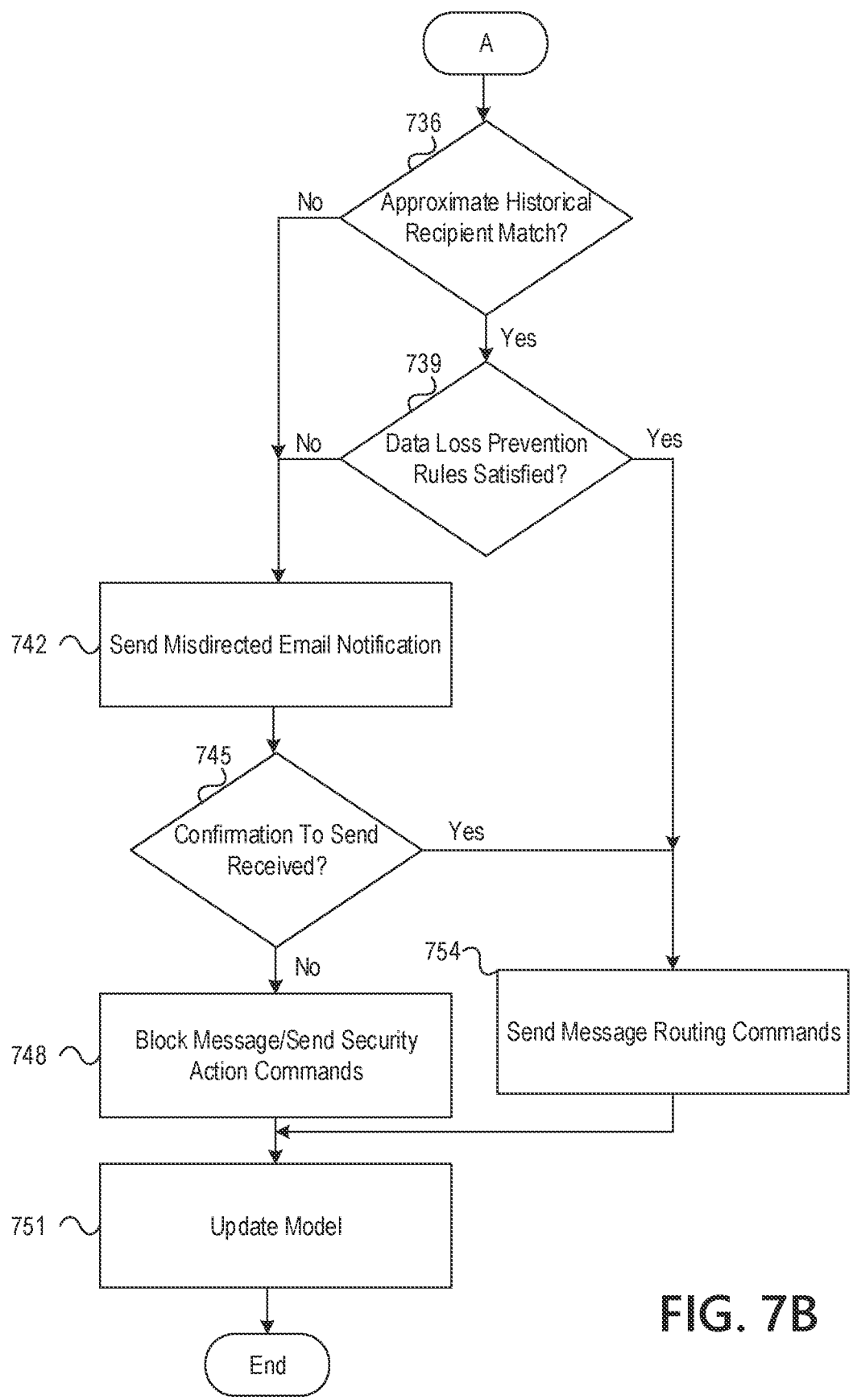
Figure 7C:
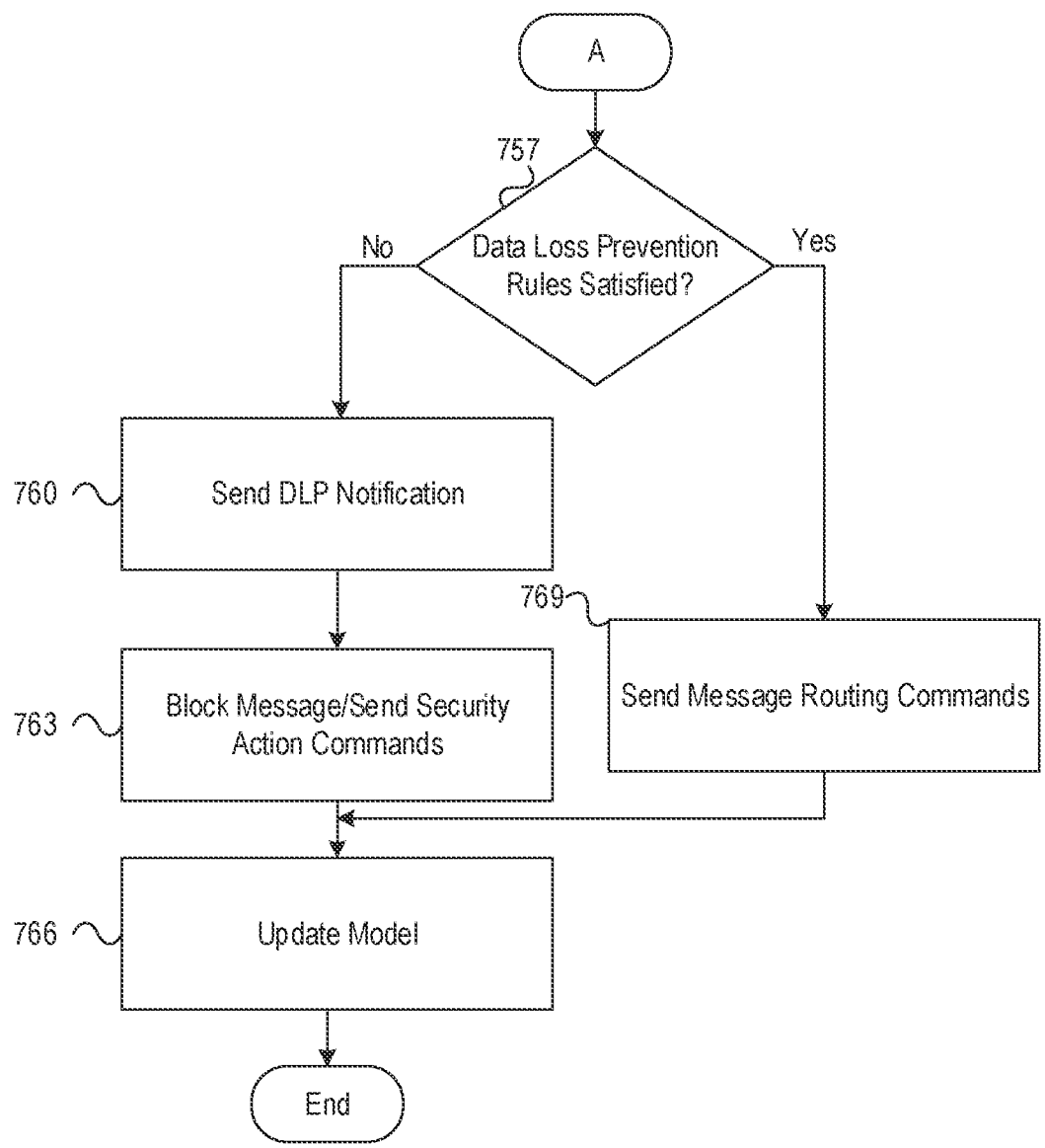

FIGS. 7A-7C depict an illustrative method for preventing data loss due to misdirected emails in accordance with one or more example embodiments. Referring to FIG. 7A, at step 703, a computing platform having at least one processor, a communication interface, and memory may receive historical message information. At step 706, the computing platform may generate a user graph based on the historical message information. At step 709, the computing platform may train a misdirected email identification model using the historical message information. At step 712, the computing platform may receive data loss prevention information/criteria. At step 715, the computing platform may receive message information for a first message. At step 718, the computing platform may identify the nearest neighbors of the message sender using the user graph. At step 721, the computing platform may identify whether or not the message recipient is a context match (e.g., whether context of the message matches context of previous messages between the message sender and the message recipient). If the message recipient is not a context match, the computing platform may proceed to step 724.

At step 724, the computing platform may identify whether the intended recipient is one of the identified nearest neighbors. If the intended recipient is one of the nearest neighbors, the computing platform may proceed to step 727. Otherwise, if the intended recipient is not one of the nearest neighbors, the computing platform may proceed to step 730.

At step 727, the computing platform may identify whether the context of the first message is an approximate match with context of historical messages between the message sender and the identified nearest neighbors. If the context is an approximate match, the computing platform may proceed to step 739. If the context is not an approximate match, the computing platform may proceed to step 730.

At step 730, the computing platform may expand the nearest neighbors set, using the user graph, to include a nearest neighbor set for each originally identified nearest neighbor. At step 733, the computing platform may identify whether there is a context match between the first message and previous message sent between the message sender and/or the individuals of the expanded nearest neighbors set. If there is a context match, the computing platform may proceed to step 739. If there is not a context match, the computing platform may proceed to step 736 in FIG. 7B.

Referring to FIG. 7B, at step 736, the computing platform may identify whether the first message context is an approximate historical match with historical messages sent by the message sender. If an approximate historical recipient match is not identified, the computing platform may proceed to step 742. If an approximate historical recipient match is identified, the computing platform may proceed to step 739. At step 739, the computing platform may identify whether the content of the first message satisfies the data loss prevention rules/criteria. If the data loss prevention rules are satisfied, the computing platform may proceed to step 754. If the data loss prevention rules are not satisfied, the computing platform may proceed to step 742.

At step 742, the computing platform may send a misdirected email notification indicating that the first message is potentially misdirected, and prompting for confirmation to send the first message. At step 745, the computing platform may identify whether confirmation to send the first message was received. If confirmation was not received, the computing platform may proceed to step 748.

At step 748, the computing platform may block the first message from being sent and/or send security actions commands directed a network gateway to execute one or more additional security actions. At step 751, the computing platform may update the misdirected email identification model based on any information of the first message, outputs of the misdirected email identification model, and/or user feedback.

Returning to step 745, if confirmation to send the first message was received, the computing platform may proceed to step 754. At step 754, the computing platform may send one or more commands directing the network gateway to route the first message to the corresponding recipient.

Returning to step 721 in FIG. 7A, if the computing platform identified that the message recipient is a context match, the computing platform may proceed to step 757. Referring to FIG. 7C, at step 757, the computing platform may identify whether the content of the first message satisfies the data loss prevention rules/criteria. If the data loss prevention rules are satisfied, the computing platform may proceed to step 769. If the data loss prevention rules are not satisfied, the computing platform may proceed to step 760.

At step 760, the computing platform may send a data loss prevention notification, indicating that the first message includes sensitive and/or confidential information, and will not be sent. At step 763, the computing platform may block the first message from being sent and/or send security actions commands directed a network gateway to execute one or more additional security actions. At step 766, the computing platform may update the misdirected email identification model based on any information of the first message, outputs of the misdirected email identification model, and/or user feedback.

Returning to step 757, if confirmation to send the first message was received, the computing platform may proceed to step 769. At step 769, the computing platform may send one or more commands directing the network gateway to route the first message to the corresponding recipient.

Figure 10:
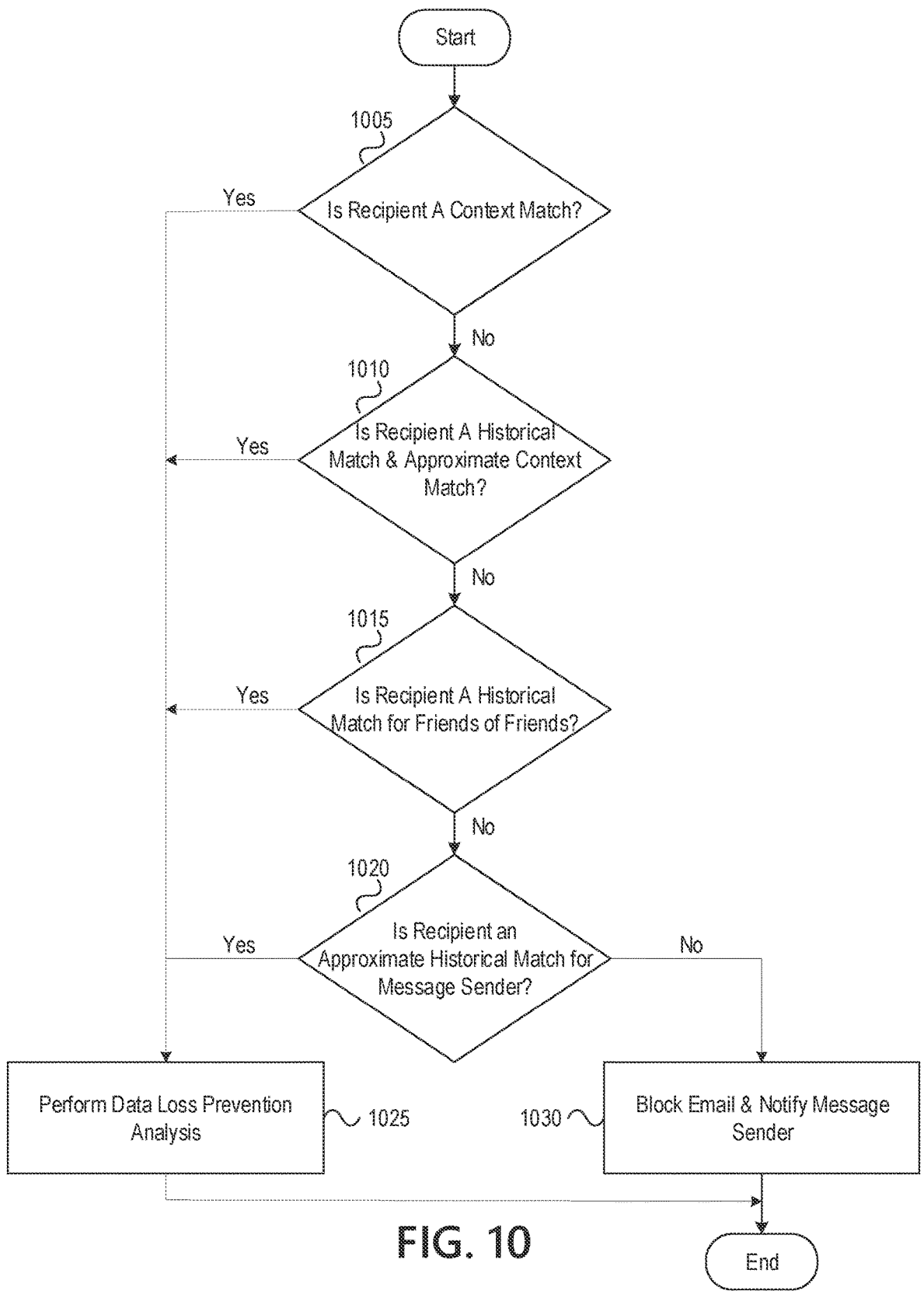
FIG. 10 depicts an illustrative method for preventing data loss due to misdirected emails in accordance with one or more example embodiments.

FIG. 10 depicts a simplified version of the misdirected email detection method, described in the event sequence above. For example, at step 1005, the misdirected email identification platform 110 may identify whether historical messages between the message sender and the message recipient have a matching context with the new message. If there is a matching context, the misdirected email identification platform 110 may proceed to step 1025. Otherwise, the misdirected email identification platform 110 may proceed to step 1010.

At step 1010, the misdirected email identification platform 110 may identify whether the recipient is one of the nearest neighbors of the message sender and whether the context of the message is an approximate match with previously sent messages from the message sender. If both conditions are satisfied, the misdirected email identification platform may proceed to step 1025. Otherwise, the misdirected email identification platform 110 may proceed to step 1015.

At step 1015, the misdirected email identification platform 110 may identify whether the recipient is within an expanded group of nearest neighbors for the message sender (e.g., friends of friends). If the recipient is within the expanded group of nearest neighbors, the misdirected email identification platform 110 may proceed to step 1025. Otherwise, the misdirected email identification platform 110 may proceed to step 1020.

At step 1020, the misdirected email identification platform 110 may identify whether the recipient address is an approximate match with addresses of nearest neighbors of the message sender. If the recipient address is an approximate match, the misdirected email identification platform may proceed to step 1025. For example, at step 1025, the misdirected email identification platform 110 may perform a data loss prevention analysis as described above. Otherwise, if the recipient address is not an approximate match, the misdirected email identification platform 110 may block the message, and may notify the message sender at step 1030.

It should be understood that the analysis processes, method steps, and/or methods described herein may be performed in different orders and/or in alternative arrangements from those illustrated herein, without departing from the scope of this disclosure. Additionally or alternatively, one or more of the analysis processes, method steps, and/or methods described herein may be optional and/or omitted in some arrangements, without departing from the scope of this disclosure.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   detect input of a first target recipient domain into a first email message;
   identify, in real time and prior to sending the first email message, that the first target recipient domain comprises an unintended recipient domain instead of an intended recipient domain, wherein identifying that the first target recipient domain comprises an unintended recipient domain instead of an intended recipient domain comprises analyzing, using a user graph and a decision tree model, an identity of the first target recipient domain and a context of the first email message, wherein analyzing the first email message using the user graph and the decision tree model comprises:
   identifying, using the user graph, a plurality of nearest neighbor recipients for a message sender of the first email message;
   identifying that historical messages between the message sender and the first target recipient domain do not include a first level match of the context of the first email message by:
   identifying that: a) the first target recipient domain corresponds to a user included in the plurality of nearest neighbor recipients, and b) the context of the first email message is a second level match with a context of one or more of historical messages between the message sender and the nearest neighbor recipients, and
identify, in real time and prior to sending the first email message, that the first target recipient domain comprises the unintended recipient domain;
identify, in real time and prior to sending the first email message, that the first email message violates one or more data loss prevention rules; and
based on identifying that the first target recipient domain comprises an unintended recipient domain and that the first email message violates the one or more data loss prevention rules, send a notification that the first target recipient domain is flagged as an unintended recipient domain and one or more commands directing a user device of the message sender to display the notification.

2. The computing platform of claim 1, wherein identifying that the first email message violates the one or more data loss prevention rules comprises receiving a notification from a data loss prevention system, different that the computing platform, indicating that the first email message violates the one or more data loss prevention rules.

3. The computing platform of claim 1, wherein identifying that the first target recipient domain comprises an unintended recipient domain instead of an intended recipient domain further comprises receiving a notification from a misdirected email system, different than the computing platform, indicating that the first target recipient domain comprises an unintended recipient domain.

4. The computing platform of claim 1, wherein:
identifying that the first target recipient domain comprises an unintended recipient domain instead of an intended recipient domain further comprises applying one or more machine learning techniques, by the computing platform, to the first email message; and
identifying that the first email message violates the one or more data loss prevention rules comprises analyzing, by the computing platform, the first email message based on one or more data loss prevention rules stored at the computing platform.

5. The computing platform of claim 1, wherein the one or more data loss prevention rules comprise manually input rules defining message characteristics that, if identified, cause a corresponding email message to be flagged.

6. The computing platform of claim 1, wherein the memory stores additional computer readable instructions that, when executed by the at least one processor, further cause the computing platform to:
detect input of a second target recipient domain into a second email message;
identify, in real time and prior to sending the second email message, that the second target recipient domain comprises an unintended recipient domain instead of an intended recipient domain;
identify, in real time and prior to sending the second email message, that the second email message complies with each of the one or more data loss prevention rules; and
based on identifying that the second email message complies with each of the one or more data loss prevention rules, route the second email message to the unintended recipient domain.

7. The computing platform of claim 1, wherein the memory stores additional computer readable instructions that, when executed by the at least one processor, further cause the computing platform to:
detect input of a second target recipient domain into a second email message; and
identify, in real time and prior to sending the second email message, that the second target recipient domain comprises a second unintended recipient domain instead of a second intended recipient domain, wherein identifying that the second target recipient domain comprises the second unintended recipient domain instead of the second intended recipient domain comprises analyzing, using the user graph and the decision tree model, an identity of the second target recipient domain and a context of the second email message.

8. The computing platform of claim 7, wherein analyzing the second email message using the user graph and the decision tree model comprises:
identifying, using the user graph, a plurality of nearest neighbor recipients for a message sender of the second email message;
identifying, using a plurality of machine learning models, a context of the second email message;
identifying whether historical messages between the message sender of the second email message and second target recipient domain include a first level match of the context of the second email message;
based on identifying that the historical messages between the message sender of the second email message and the second target recipient domain include the context of the second email message, identifying whether the second email message violates the one or more data loss prevention rules;
based on identifying that the historical messages between the message sender of the second email message and the second target recipient domain do not include the first level match of the context of the second email message:
identifying whether the second target recipient domain corresponds to a user included in the plurality of nearest neighbor recipients;
identifying whether the context of the second email message is a second level match with a context of one or more of historical messages between the message sender of the second email message and the nearest neighbor recipients;
based on identifying that: a) the second target recipient domain corresponds to a user included in the plurality of nearest neighbor recipients, and b) the context of the first second email message is a second level match with a context of one or more of historical messages between the message sender of the second email message and the nearest neighbor recipients, sending a notification to the user device of the message sender of the second email message indicating that the second email message may be intended for a different recipient and prompting the message sender of the second email message to send the second email message or modify the second target recipient domain;
based on identifying that either: a) the second target recipient domain does not correspond to a user included in the plurality of nearest neighbor recipients, or b) the context of the second email message is not a second level match with a context of one or more of historical messages between the message sender of the second email message and the nearest neighbor recipients:

identifying, for each nearest neighbor recipient, a corresponding new plurality of nearest neighbor recipients;

identifying whether the second target recipient domain is a third level match with a user included in one or more of the new pluralities of nearest neighbor recipients;

based on identifying that the second target recipient domain is a third level match with a user included in the one or more of the new pluralities of nearest neighbor recipients, sending a notification to the user device of the message sender of the second email message indicating that the second email message may be intended for a different recipient and prompting the message sender to send the first second email message or modify the second target recipient domain;

based on identifying that the second target recipient domain is not a third level match with a user included in the one or more of the new pluralities of nearest neighbor recipients:

if the context of the second email message was identified as a second level match with a context of the one or more historical messages between the message sender of the second email message and the nearest neighbor recipients, sending a notification to the user device of the message sender of the second email message indicating that the second email message may be intended for a different recipient and prompting the message sender of the second email message to send the second email message or modify the second target recipient domain, wherein the notification includes a spelling mistake recommendation indicating a difference between the second target recipient domain and one or more recipient domains of the approximate context match; and if the context of the second email message was not identified as a second level match with a context of the one or more historical messages between the message sender of the second email message and the nearest neighbor recipients, sending a notification to the user device of the message sender of the second email message indicating that the second email message may be intended for a different recipient and prompting the message sender of the second email message to send the second email message or modify the second target recipient domain.

9. The computing platform of claim 8, wherein the plurality of machine learning models includes: latent Dirichlet allocation (LDA), named entity recognition (NER), and text summarization.

10. The computing platform of claim 9, wherein the memory stores additional computer readable instructions that, when executed by the at least one processor, further cause the computing platform to:

identify the context of the first email message, wherein identifying the context of the first email message comprises:

identifying, using the LDA, one or more topics in the first email message, identifying, using the NER, one or more named entities in the first email message, and identifying, using the text summarization, a predetermined number of most frequently used keywords in the first email message.

11. A method, comprising:

at a computing platform comprising at least one processor, a communication interface, and memory:

detecting input of a first target recipient domain into a first email message;

identifying, in real time and prior to sending the first email message, that the first target recipient domain comprises an unintended recipient domain instead of an intended recipient domain, wherein identifying that the first target recipient domain comprises an unintended recipient domain instead of an intended recipient domain comprises analyzing, using a user graph and a decision tree model, an identity of the first target recipient domain and a context of the first email message, wherein analyzing the first email message using the user graph and the decision tree model comprises:

identifying, using the user graph, a plurality of nearest neighbor recipients for a message sender of the first email message;

identifying that historical messages between the message sender and the first target recipient domain do not include a first level match of the context of the first email message by:

identifying that: a) the first target recipient domain corresponds to a user included in the plurality of nearest neighbor recipients, and b) the context of the first email message is a second level match with a context of one or more of historical messages between the message sender and the nearest neighbor recipients, and identify, in real time and prior to sending the first email message, that the first target recipient domain comprises the unintended recipient domain;

identifying, in real time and prior to sending the first email message, that the first email message violates one or more data loss prevention rules; and based on identifying that the first target recipient domain comprises an unintended recipient domain and that the first email message violates the one or more data loss prevention rules, sending a notification that the first target recipient domain is flagged as an unintended recipient domain and one or more commands directing a user device of the message sender to display the notification, wherein identifying that the first email message violates the one or more data loss prevention rules comprises receiving a notification from a data loss prevention system, different that the computing platform, indicating that the first email message violates the one or more data loss prevention rules.

12. The method of claim 11, wherein identifying that the first target recipient domain comprises an unintended recipient domain instead of an intended recipient domain further comprises receiving a notification from a misdirected email system, different than the computing platform, indicating that the first target recipient domain comprises an unintended recipient domain.

13. The method of claim 11, wherein:

identifying that the first target recipient domain comprises an unintended recipient domain instead of an intended recipient domain further comprises applying one or more machine learning techniques, by the computing platform, to the first email message; and identifying that the first email message violates the one or more data loss prevention rules comprises analyzing, by the computing platform, the first email message based on one or more data loss prevention rules stored at the computing platform.

14. The method of claim 11, wherein the one or more data loss prevention rules comprise manually input rules defining message characteristics that, if identified, cause a corresponding email message to be flagged.

15. The method of claim 11, further comprising:
detecting input of a second target recipient domain into a second email message;
identifying, in real time and prior to sending the second email message, that the second target recipient domain comprises an unintended recipient domain instead of an intended recipient domain;
identifying, in real time and prior to sending the second email message, that the second email message complies with each of the one or more data loss prevention rules; and
based on identifying that the second email message complies with each of the one or more data loss prevention rules, routing the second email message to the unintended recipient domain.

16. The method of claim 11, further comprising:
detecting input of a second target recipient domain into a second email message; and
identifying, in real time and prior to sending the second email message, that the second target recipient domain comprises a second unintended recipient domain instead of a second intended recipient domain, wherein identifying that the second target recipient domain comprises the second unintended recipient domain instead of the second intended recipient domain comprises analyzing, using the user graph and the decision tree model, an identity of the second target recipient domain and a context of the second email message.

17. The method of claim 16, wherein analyzing the second email message using the user graph and the decision tree model comprises:
identifying, using the user graph, a plurality of nearest neighbor recipients for a message sender of the second email message;
identifying, using a plurality of machine learning models, a context of the second first email message;
identifying whether historical messages between the message sender of the second email message and second target recipient domain include a first level match of the context of the second email message;
based on identifying that the historical messages between the message sender of the second email message and the second target recipient domain include the context of the second email message, identifying whether the second email message violates the one or more data loss prevention rules;
based on identifying that the historical messages between the message sender of the second email message and the second target recipient domain do not include the first level match of the context of the second email message:
identifying whether the second target recipient domain corresponds to a user included in the plurality of nearest neighbor recipients;
identifying whether the context of the second email message is a second level match with a context of one or more of historical messages between the message sender of the second email message and the nearest neighbor recipients;
based on identifying that: a) the second target recipient domain corresponds to a user included in the plurality of nearest neighbor recipients, and b) the context of the first second email message is a second level match with a context of one or more of historical messages between the message sender of the second email message and the nearest neighbor recipients, sending a notification to the user device of the message sender of the second email message indicating that the second email message may be intended for a different recipient and prompting the message sender of the second email message to send the second email message or modify the second target recipient domain;
based on identifying that either: a) the second target recipient domain does not correspond to a user included in the plurality of nearest neighbor recipients, or b) the context of the second email message is not a second level match with a context of one or more of historical messages between the message sender of the second email message and the nearest neighbor recipients:
identifying, for each nearest neighbor recipient, a corresponding new plurality of nearest neighbor recipients;
identifying whether the second target recipient domain is a third level match with a user included in one or more of the new pluralities of nearest neighbor recipients;
based on identifying that the second target recipient domain is a third level match with a user included in the one or more of the new pluralities of nearest neighbor recipients, sending a notification to the user device of the message sender of the second email message indicating that the second email message may be intended for a different recipient and prompting the message sender to send the first second email message or modify the second target recipient domain;
based on identifying that the second target recipient domain is not a third level match with a user included in the one or more of the new pluralities of nearest neighbor recipients:
if the context of the second email message was identified as a second level match with a context of the one or more historical messages between the message sender of the second email message and the nearest neighbor recipients, sending a notification to the user device of the message sender of the second email message indicating that the second first email message may be intended for a different recipient and prompting the message sender of the second email message to send the second email message or modify the second target recipient domain, wherein the notification includes a spelling mistake recommendation indicating a difference between the second target recipient domain and one or more recipient domains of the approximate context match; and
if the context of the second email message was not identified as a second level match with a context of the one or more historical messages between the message sender of the second email message and the nearest neighbor recipients, sending a notification to the user device of the message sender of the second email message indicating that the second email message may be intended for a different recipient and prompting the message sender of the second email message to send the second email message or modify the second target recipient domain.

18. The method of claim 17, wherein the plurality of machine learning models includes: latent Dirichlet allocation (LDA), named entity recognition (NER), and text summarization.

19. The method of claim 18, further comprising:
identifying the context of the first email message, wherein identifying the context of the first email message comprises:
identifying, using the LDA, one or more topics in the first email message,
identifying, using the NER, one or more named entities in the first email message, and
identifying, using the text summarization, a predetermined number of most frequently used keywords in the first email message.

20. One or more non-transitory computer-readable media storing instructions that, when executed by a computing platform comprising at least one processor, a communication interface, and memory, cause the computing platform to:
detect input of a first target recipient domain into a first email message;
identify, in real time and prior to sending the first email message, that the first target recipient domain comprises an unintended recipient domain instead of an intended recipient domain, wherein identifying that the first target recipient domain comprises an unintended recipient domain instead of an intended recipient domain comprises analyzing, using a user graph and a decision tree model, an identity of the first target recipient domain and a context of the first email message, wherein analyzing the first email message using the user graph and the decision tree model comprises:
identifying, using the user graph, a plurality of nearest neighbor recipients for a message sender of the first email message;
identifying that historical messages between the message sender and the first target recipient domain do not include a first level match of the context of the first email message by:
identifying that: a) the first target recipient domain corresponds to a user included in the plurality of nearest neighbor recipients, and b) the context of the first email message is a second level match with a context of one or more of historical messages between the message sender and the nearest neighbor recipients, and
identify, in real time and prior to sending the first email message, that the first target recipient domain comprises the unintended recipient domain;
identify, in real time and prior to sending the first email message, that the first email message violates one or more data loss prevention rules; and
based on identifying that the first target recipient domain comprises an unintended recipient domain and that the first email message violates the one or more data loss prevention rules, send a notification that the first target recipient domain is flagged as an unintended recipient domain and one or more commands directing a user device of the message sender to display the notification.

* * * * *